(12) United States Patent
Yaguchi

(10) Patent No.: US 7,068,846 B1
(45) Date of Patent: Jun. 27, 2006

(54) IMAGE INPUT APPARATUS AND CONTROL METHOD THEREFOR

(75) Inventor: Hiroyuki Yaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1095 days.

(21) Appl. No.: 09/704,982

(22) Filed: Nov. 2, 2000

(30) Foreign Application Priority Data

Nov. 4, 1999 (JP) .................................... 11-314138

(51) Int. Cl.
*G06K 9/36* (2006.01)

(52) U.S. Cl. ................................................ 382/232
(58) Field of Classification Search ................ 358/1.15, 358/426.01, 426.03, 426.05, 426.06, 426.07, 358/426.11; 382/232, 233, 235, 239; 375/240, 375/240.02, 240.21, 240.25; 348/384.1, 387.1, 348/390.1, 392.1, 399.1, 404.1, 405.1, 419.1, 348/424.1, 424.2, 427.1
See application file for complete search history.

(56) References Cited

U.S. PATENT DOCUMENTS

| | | | | | |
|---|---|---|---|---|---|
| 5,414,530 | A | * | 5/1995 | Sakai | 358/451 |
| 5,901,278 | A | * | 5/1999 | Kurihara et al. | 358/1.15 |
| 5,937,100 | A | * | 8/1999 | Kitajima | 382/251 |
| 5,956,430 | A | | 9/1999 | Kunitake et al. | |
| 5,970,176 | A | * | 10/1999 | Takayama | 382/239 |
| 6,266,449 | B1 | * | 7/2001 | Ohsawa | 382/239 |
| 6,285,714 | B1 | * | 9/2001 | Kawaguchi et al. | 375/240.21 |
| 6,487,366 | B1 | * | 11/2002 | Morimoto et al. | 386/117 |
| 6,594,031 | B1 | * | 7/2003 | Taima | 358/1.15 |

FOREIGN PATENT DOCUMENTS

| | | |
|---|---|---|
| JP | 5-167804 | 7/1993 |
| JP | 5-091345 | 9/1993 |
| JP | 5-244367 | 9/1993 |
| JP | 7-046410 | 2/1995 |
| JP | 9-289641 | 11/1997 |
| JP | 10-200714 | 7/1998 |

OTHER PUBLICATIONS

English Abstract of JPA 10–200714 (Patent Abstracts of Japan).
English Abstract of JPA 7–046410 (Patent Abstracts of Japan).
English Abstract of JPA 5–244367 (Patent Abstracts of Japan).
English Abstract of JPA 5–091345 (Patent Abstracts of Japan).
English Abstract of JPA 5–167804 (Patent Abstracts of Japan).
English Abstract of JPA 9–289641.

* cited by examiner

*Primary Examiner*—Jose L. Couso
(74) *Attorney, Agent, or Firm*—Morgan & Finnegan, L.L.P.

(57) ABSTRACT

In an image input apparatus for compressing, in real time, image data obtained by reading an image and storing it in a memory, a memory area is ensured, an original is read and its image data is outputted, the image data is compressed in real time, the compressed image data is stored in the memory area, and it is determined whether the compressed image data is completely stored in the memory area. If it is determined that the image data is not completely stored, the compression ratio is increased, and the original read, compression of read image data, and storage of the compressed image data are repeated using the changed compression ratio.

30 Claims, 29 Drawing Sheets

FIG. 25

| USER SETTING COMPRESSION RATIO | QF | ARITHMETIC EXPRESSION |
|---|---|---|
| 1 ( LOW IMAGE QUALITY ) | 40 | $X \times Y \times 8 \times QF / 100$ |
| 2 | 50 | $X \times Y \times 8 \times QF / 100$ |
| 3 | 60 | $X \times Y \times 8 \times QF / 100$ |
| 4 | 70 | $X \times Y \times 8 \times QF / 100$ |
| 5 ( HIGH IMAGE QUALITY ) | 80 | $X \times Y \times 8 \times QF / 100$ |

X : MAIN-SCANNING DIRECTION IMAGE SIZE ( THE NUMBER OF PIXELS )
Y : SUB-SCANNING DIRECTION IMAGE SIZE ( THE NUMBER OF PIXELS )

IMAGE INPUT APPARATUS AND CONTROL METHOD THEREFOR

FIELD OF THE INVENTION

The present invention relates to an image input apparatus and a control method therefor and, more particularly, to an image input apparatus for compressing a scanned image and storing it and a control method for the apparatus.

BACKGROUND OF THE INVENTION

The advent of multi-function copying machines, network scanners, and printers has made it possible to freely exchange images with computers through networks. These devices generally use image compression techniques to reduce the load on the networks. In recent years, irreversible JPEG compression is often used as an image compression technique for multilevel images (color images). In this compression method, however, the amount of compressed data cannot be known before all the image data is actually compressed. This technique is therefore supposed to be inappropriate to a scanning system for compressing an image in real time because it cannot be known whether the image data can be completely stored in an image memory prepared in advance.

In another method, even when compressed data is larger in size than the memory capacity ensured to hold the image and cannot be completely stored, that amount of compressed data is measured, the necessary memory capacity is ensured, and then, scanning is performed for the second time to obtain image data. However, if the measured amount of compressed data exceeds the available memory capacity, the image cannot be acquired.

SUMMARY OF THE INVENTION

The present invention has been made in consideration of the above situation, and has as its object to, in reading, compressing, and storing an image in a storage medium such as a memory, more reliably store the whole compressed image data in the second scanning even when an error occurs during the first scanning.

According to the present invention, the foregoing object is attained by providing a control method for an image input apparatus for reading an original and compressing image data of the read original in real time, the method comprising: a memory area ensuring step of ensuring a memory area for storing compressed image data; a read step of reading an original and outputting image data; a compression step of compressing the image data in real time; a storage step of storing the compressed image data in the memory area ensured in the memory area ensuring step; a determination step of determining whether the compressed image data is completely stored in the memory area; a compression ratio change step of, when it is determined in the determination step that the image data is not completely stored, changing a compression ratio in the compression step; and a repeat step of, when the compression ratio is changed in the compression ratio change step, controlling to repeat the read step, the compression step, and the storage step using the changed compression ratio.

According to the present invention, the foregoing object is attained by providing a control method for an image input apparatus for reading an original and compressing image data of the read original in real time, the method comprising: a memory area ensuring step of ensuring a memory area for storing compressed image data; a read step of reading an original and outputting image data; a compression step of compressing the image data in real time; a storage step of storing the compressed image data in the memory area ensured in the memory area ensuring step; a determination step of determining whether the compressed image data is completely stored in the memory area; a resolution change step of, when it is determined in the determination step that the image data is not completely stored, changing a resolution in the read step; and a repeat step of, when the resolution is changed in the resolution change step, controlling to repeat the read step, the compression step, and the storage step using the changed resolution.

Further, the foregoing object is also attained by providing an image input apparatus comprising: memory area ensuring means for ensuring a memory area for storing compressed image data; read means for reading an original and outputting image data; compression means for compressing the image data in real time; storage means for storing the compressed image data in the memory area ensured by the memory area ensuring means; determination means for determining whether the compressed image data is completely stored in the memory area; compression ratio change means for, when it is determined by the determination means that the image data is not completely stored, changing a compression ratio used by the compression means; and control means for, when the compression ratio is changed by the compression ratio change means, controlling to repeat the read of the original using the changed compression ratio.

Further, the foregoing object is also attained by providing an image input apparatus comprising: memory area ensuring means for ensuring a memory area for storing compressed image data; read means for reading an original and outputting image data; compression means for compressing the image data in real time; storage means for storing the compressed image data in the memory area ensured by the memory area ensuring means; determination means for determining whether the compressed image data is completely stored in the memory area; resolution change means for, when it is determined by the determination means that the image data is not completely stored, changing a resolution used by the read means; and control means for, when the resolution is changed by the resolution change means, controlling to repeat the read of the original using the changed resolution.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 25 is a table related to JPEG compression settings;

DETAILED DESCRIPTION OF THE PREFERRED EMBODIMENTS

Preferred embodiments of the present invention will be described in detail in accordance with the accompanying drawings.

Overall System

Figure 1:
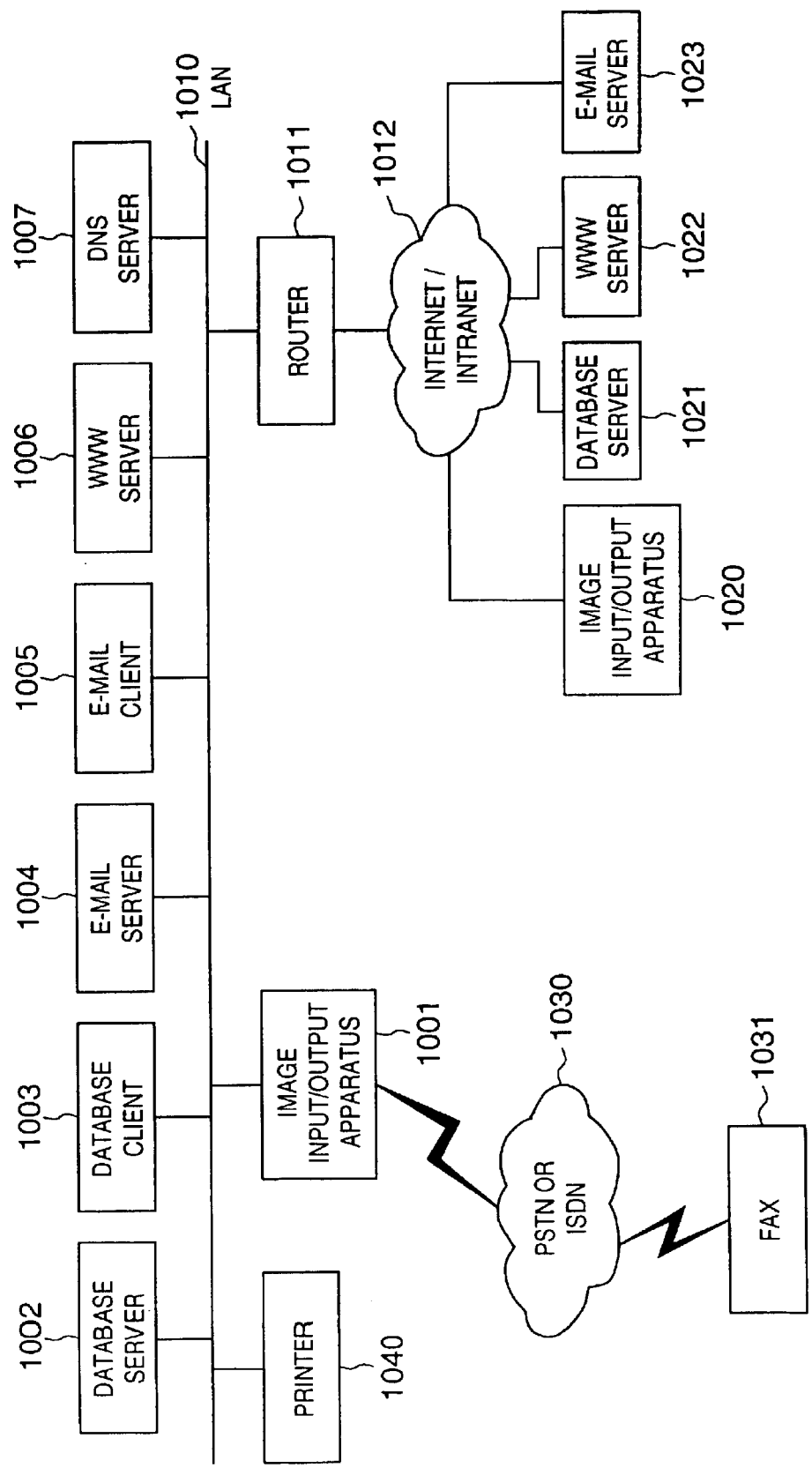
FIG. 1 is a diagram showing an example of the configuration of a network system to which an image input/output apparatus according to an embodiment of the present invention is connected.

FIG. 1 is a block diagram illustrating an example of the configuration of a network system to which an image input apparatus of this invention is connected. Reference numeral 1001 denotes an image input/output apparatus comprising a scanner, an image input apparatus of the present invention and printer. An image read in from the scanner can be sent to a local area network (LAN) 1010, and an image received from the LAN 1010 can be printed out by the printer. Further, an image read in from the scanner can be transmitted by facsimile transmission means (not shown) to a facsimile apparatus 1031 via a PSTN or ISDN 1030, and an image received via the PSTN or ISDN can be printed out by the printer.

A database server 1002 manages binary images and multilevel images, which have been read in by the input/output apparatus 1001, as a database. A database client 1003 of the database server 1002 is capable of browsing/retrieving image data that has been stored in the database 1002. An electronic mail server 1004 is capable of receiving an image, which has been read by the image input/output apparatus 1001, as an attachment to e-mail. An electronic mail client 1005 is capable of receiving and browsing mail that has been accepted by the e-mail server 1004, and of transmitting e-mail. A WWW server 1006 supplies the LAN with HTML text. HTML text provided by the WWW server 1006 can be printed by the image input/output apparatus 1001. Reference numeral 1007 denotes a DNS (Domain Name Server). A router 1011 connects the LAN 1010 to the Internet or to an intranet 1012. Devices similar to the image input/output apparatus 1001, database server 1002, WWW server 1006 and electronic mail server 1004 are connected to the Internet/intranet as devices 1020, 1021, 1022, and 1023. Further, a printer 1040 is connected on the LAN 1010 and is capable of printing out images read by the image input/output apparatus 1001.

Configuration of the Image Input/Output Apparatus

Next, a configuration of the image input/output apparatus 1001 will be explained.

Figure 2:
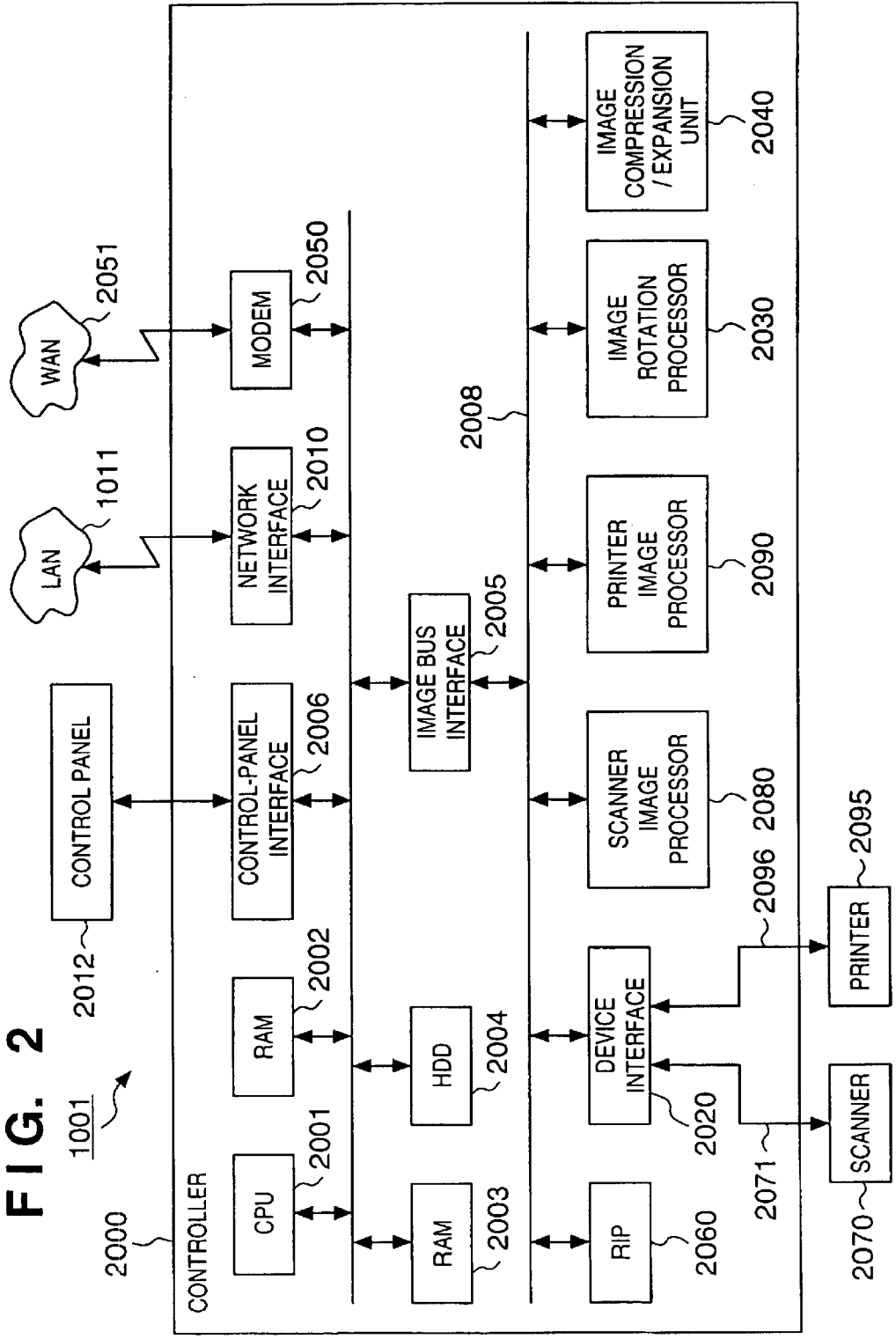
FIG. 2 is a block diagram illustrating the overall structure of the image input/output apparatus according to the embodiment of the present invention.

First, the overall structure of the input/output apparatus 1001 is explained with reference to FIG. 2. Referring to FIG. 2, the apparatus includes a controller 2000, control panel 2012 serving as a user interface (UI), a scanner 2070 serving as an image input device and a printer 2095 serving as an image output device.

By being connected to the scanner 2070 and the printer 2095 as well as the LAN 1010 or public circuit (WAN) 2051, the controller 2000 is capable of a controlling input and output of image information and device information. A CPU 2001 is a controller for controlling the overall apparatus. A RAM 2002 is a system working memory for operation of the CPU 2001. This acts as an image memory for storing image data temporarily. A ROM 2003 is a booting ROM in which the booting program of the system has been stored. A hard-disk drive (HDD) 2004 stores the system software and image data. A control-panel interface (I/F) 2006, which is for interfacing the control panel 2012, outputs image data to be displayed on the control panel 2012. Another function of the control panel 2012 is to send the CPU 2001 information that the user of the system has entered from the control panel. A modem 2050 is connected to the public circuit 2051 and serves to input and output information. Further, a network interface 2010 is connected to the LAN 1010 and serves to input and output information. The devices mentioned above are disposed on a system bus 2007.

An image bus interface 2005 is a bus bridge for connecting the system bus 2007 and an image bus 2008, which transfers image data at high speed, and for converting the data structure.

The image bus 2008 is constituted by a PCI bus or IEEE 1394. The devices set forth below are disposed on the image bus 2008.

A raster image processor (RIP) 2060 expands PDL (Page Description Language) code into a bitmap image. A device interface (I/F) 2020 connects the scanner 2070 and printer 2095 to the controller 2000 and subjects the image data to a synchronous/asynchronous conversion. A scanner image processor 2080 subjects input image data, read by the scanner 2070 and input via the device I/F 2020, to correction, manipulation and editing. A printer image processor 2090 subjects image data to be output from the printer to correction and resolution conversion, etc. in correspondence with the printer. An image rotation processor 2030 rotates image data. An image compression/expansion unit 2040 subjects multilevel image data to JPEG compression/decompression processing and subjects binary image data to JBIG, MMR or MH compression/expansion processing.

The arrangement described above is constructed in such a manner that configuration elements that connect to the system bus 2007 and configuration elements that connect to image bus 2008 are separable from each other taking into consideration expandability of the image processors. The structure of an ordinary computer is adopted. Making the image bus interface 2005 a general-purpose interface provides a degree of freedom that makes it possible to combine image processing operations at will and also affords expandability for future applications. In particular, the CODEC section (image compression/expansion unit 2040) is connected to the side of the image bus for easy interchangeability in view of the possibility that various standards may be announced in the future.

Figure 3:
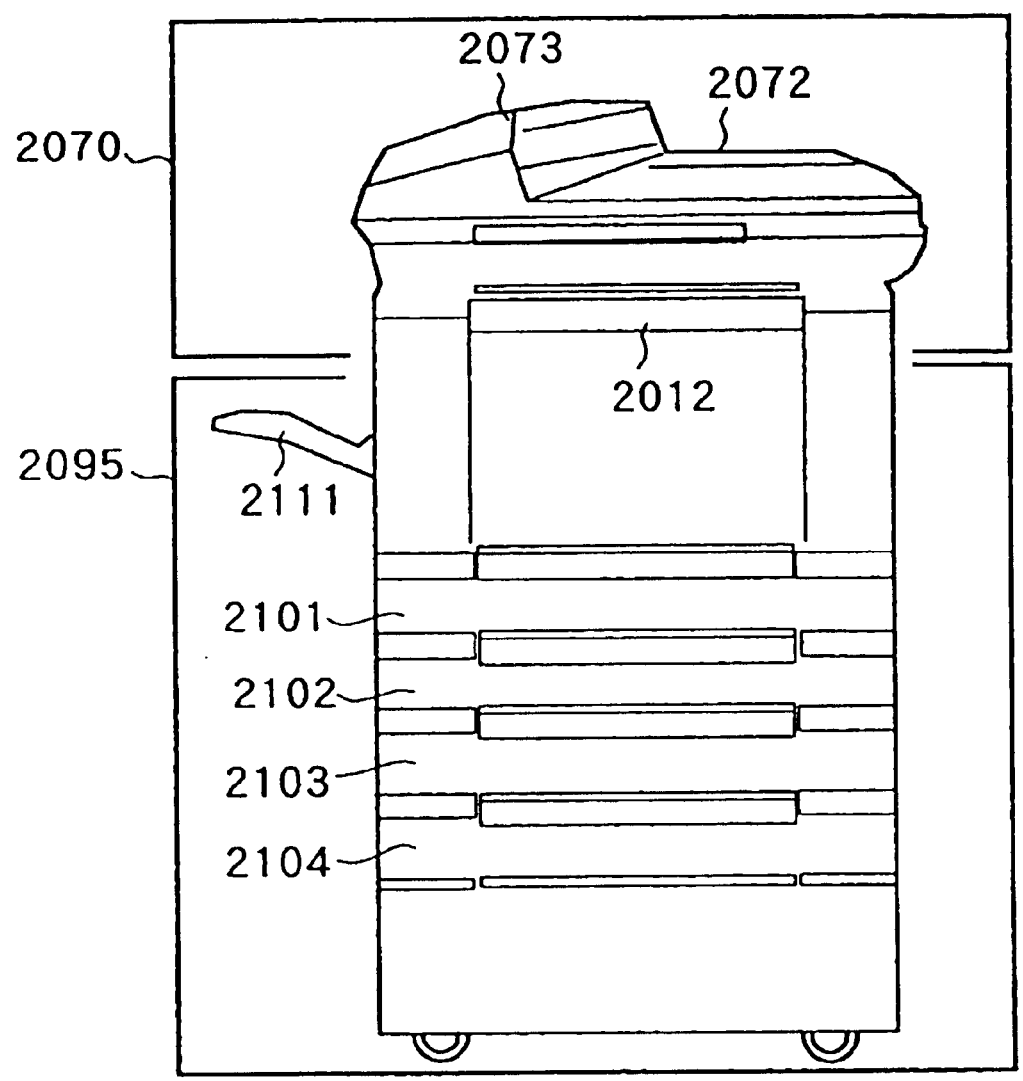
FIG. 3 is an external view of the image input/output apparatus, shown in FIG. 2, seen from the side according to the embodiment of the present invention.

FIG. 3 is a side view showing the external appearance of the image input/output apparatus 1001.

The scanner 2070, which is the image input device, illuminates a document and scans the document using a CCD line sensor (not shown) to convert the scanned image into an electric signal representing raster-image data. The document is placed on a tray 2073 of an image feeder 2072. When the user of the apparatus uses the control panel 2012 to instruct the apparatus to start reading the document, the CPU 2001 of the controller 2000 applies a command to the scanner 2070. The feeder 2072 feeds in the document one sheet at a time so that the document images are read.

The printer 2095 serving as the image output device visualizes (prints) the raster-image data on a recording medium such as paper. Any printing technique may be used in the printer. Examples are electrophotography, which employs a photosensitive drum or belt, or an ink-jet technique, which forms an image directly on paper by jetting ink from an array of micronozzles. The printing operation is started up in response to a command from the CPU 2001. The printer 2095 possesses a plurality of supply bins that make it possible to select printing media of different sizes or orientations, as well as cassettes 2101, 2102, 2103 and 2104 corresponding to these bins. A drop tray receives the printing medium on which printing has been completed.

Figure 4:
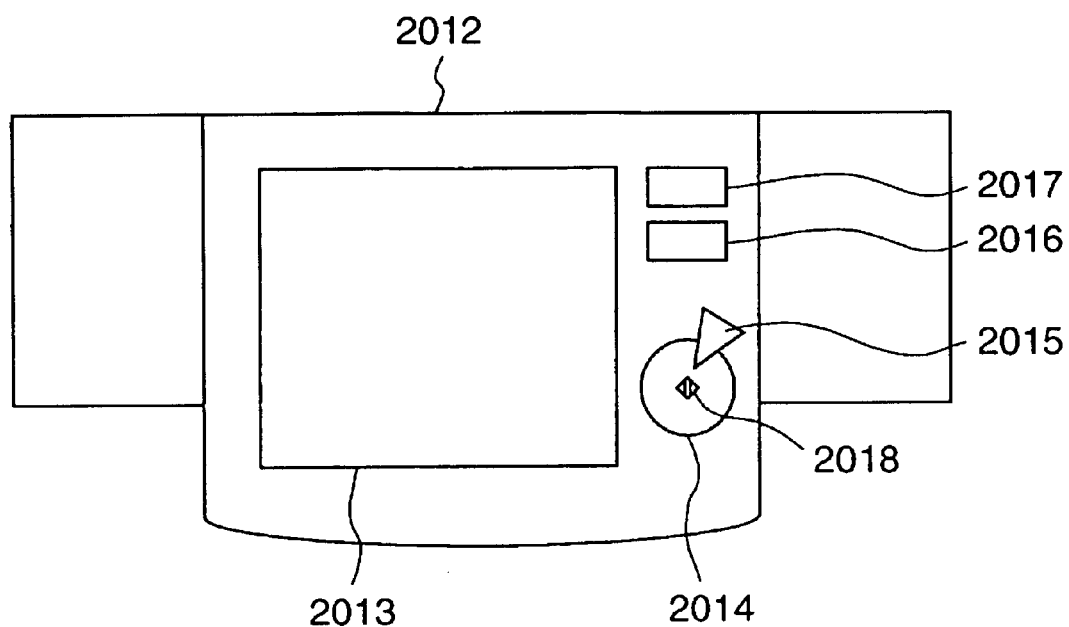
FIG. 4 is a diagram showing the external appearance of a control panel of the image input/output apparatus according to the embodiment of the present invention.

The control panel 2012 is located at a position where the user can easily observe, and an example of the external appearance is shown in FIG. 4. An LCD display unit 2013 includes a touch-sensitive panel affixed to a liquid crystal display and displays a screen for operating the system. Further, if displayed keys are pressed, the corresponding position information is sent to the controller CPU 2001. A start key 2014 is used to start the reading of a document image. Provided at the center of the start key 2014 is a two-color (green and red) LED 2018 the color of which indicates whether the start key 2014 is operable. A stop key 2015 is for halting an operation that is currently in progress. An ID key 2016 is used when the user inputs a user ID. A reset key 2017 is used to initialize settings from the control panel.

Next, the configuration elements of the controller 2000 will be explained.

(Scanner Image Processor)

Figure 5:
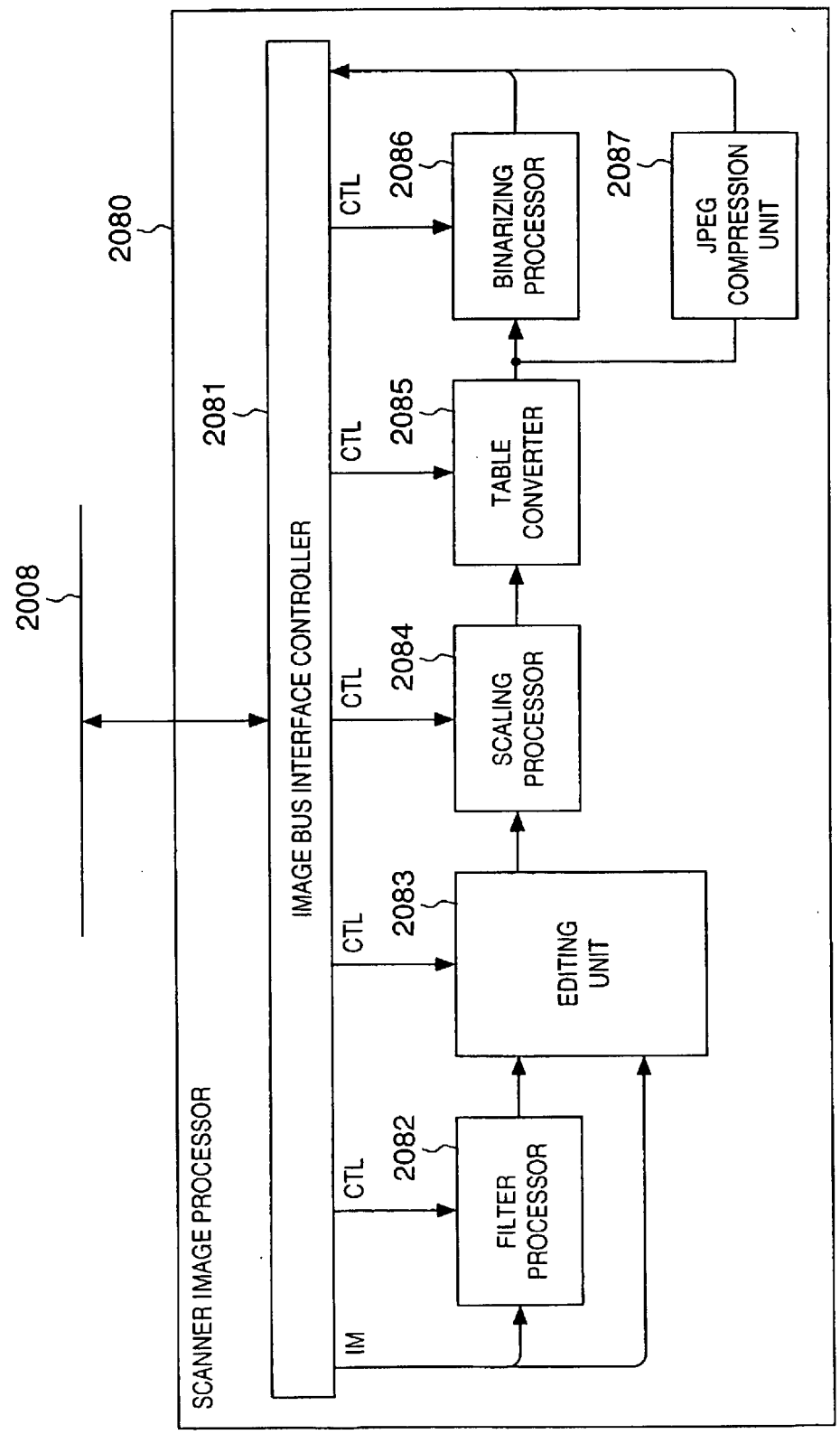
FIG. 5 is a block diagram illustrating the configuration of a scanner image processor according to the embodiment of the present invention.

FIG. 5 shows the construction of the scanner image processor 2080. An image bus interface controller 2081 connects to the image bus 2008 and controls the bus access sequence, generates timing and controls each device within the scanner image processor 2080 with a control signal (CTL). A filter processor 2082 is a spatial processor for executing a convolution operation on an input image data (IM). An editing unit 2083 recognizes a closed area, namely an area that has been enclosed by a marker pen, from the input image data, and subjects the image data in this closed area to image manipulation processing such as shadowing, hatching and negative-positive reversal.

A scaling processor 2084 performs enlargement and reduction by executing interpolation in the main-scan direction of the raster image in a case of changing resolution of the read image. With regard to enlargement and reduction in the sub-scan direction, this is carried out by changing the moving speed of the image reading line sensor (not shown) in the sub-scan direction; therefore, the scaling processor 2084 does not perform enlargement and reduction in the sub-scan direction. A table converter 2085 uses a table to convert image data, which is read luminance data, to density data. A binarizing processor 2086 binarizes multilevel grayscale image data by error-diffusion processing or screen processing. JPEG compression unit 2087 performs real-time compressing on the multilevel image data output from the table using known JPEG compression. Code data encoded by JPEG coding is output from the JPEG compression unit 2087. Image data the processing of which has been completed is transferred on the image bus again via the image bus interface controller 2081.

(Printer Image Processor)

Figure 6:
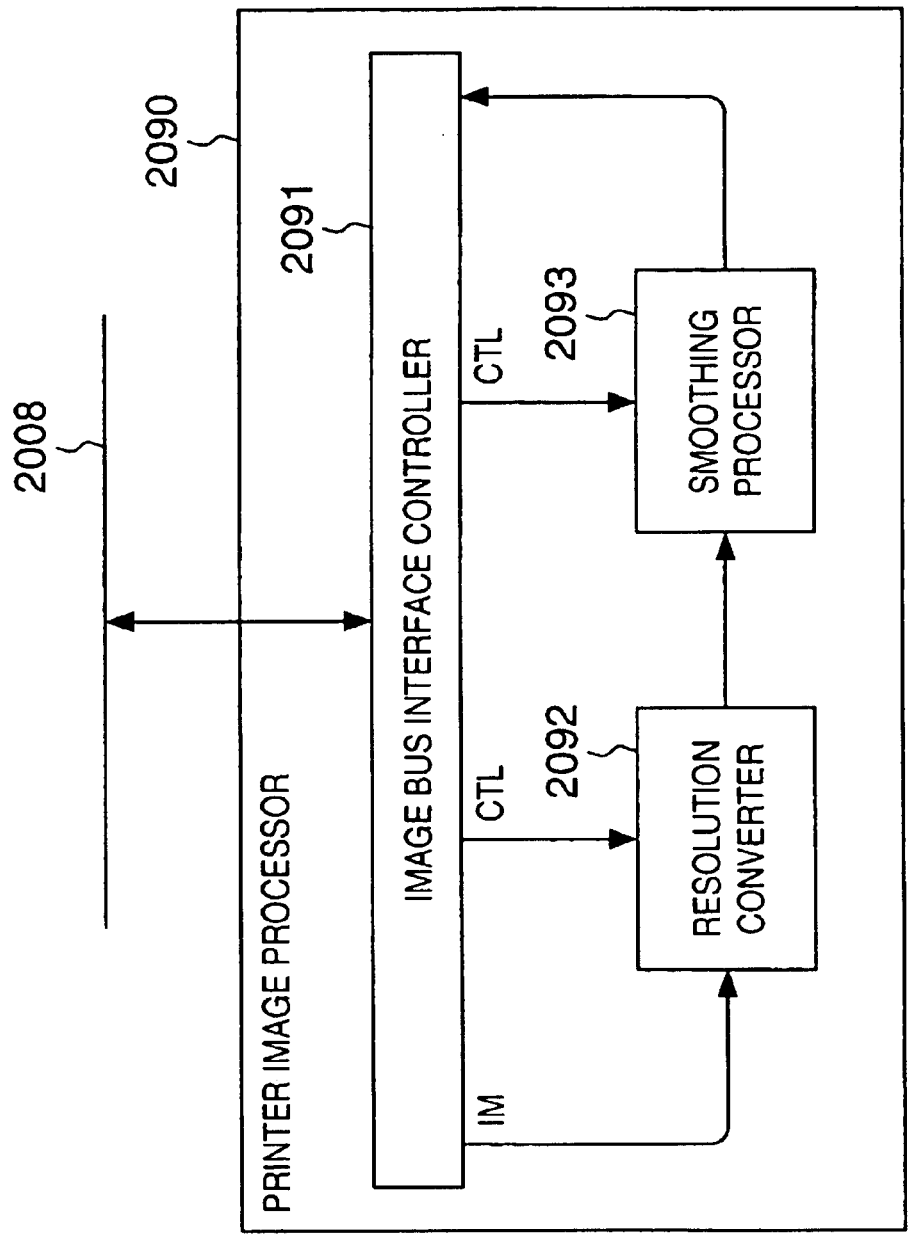
FIG. 6 is a block diagram illustrating the configuration of a printer image processor according to the embodiment of the present invention.

FIG. 6 shows the construction of the printer image processor 2090. An image bus interface controller 2091 connects to the image bus 2008 and controls the bus access sequence, generates timing and controls each device within the printer image processor 2090 with a control signal (CTL). A resolution converter 2092 executes a resolution conversion to convert the resolution of image data (IM), which has been received from the LAN 2011 or WAN 2051, to the resolution of the printer 2095. A smoothing processor 2093 executes processing so as to smoothen jaggies (jaggedness which appears at edges of diagonal lines and the like) after the resolution conversion.

(Image Compression/Expansion Unit)

Figure 7:
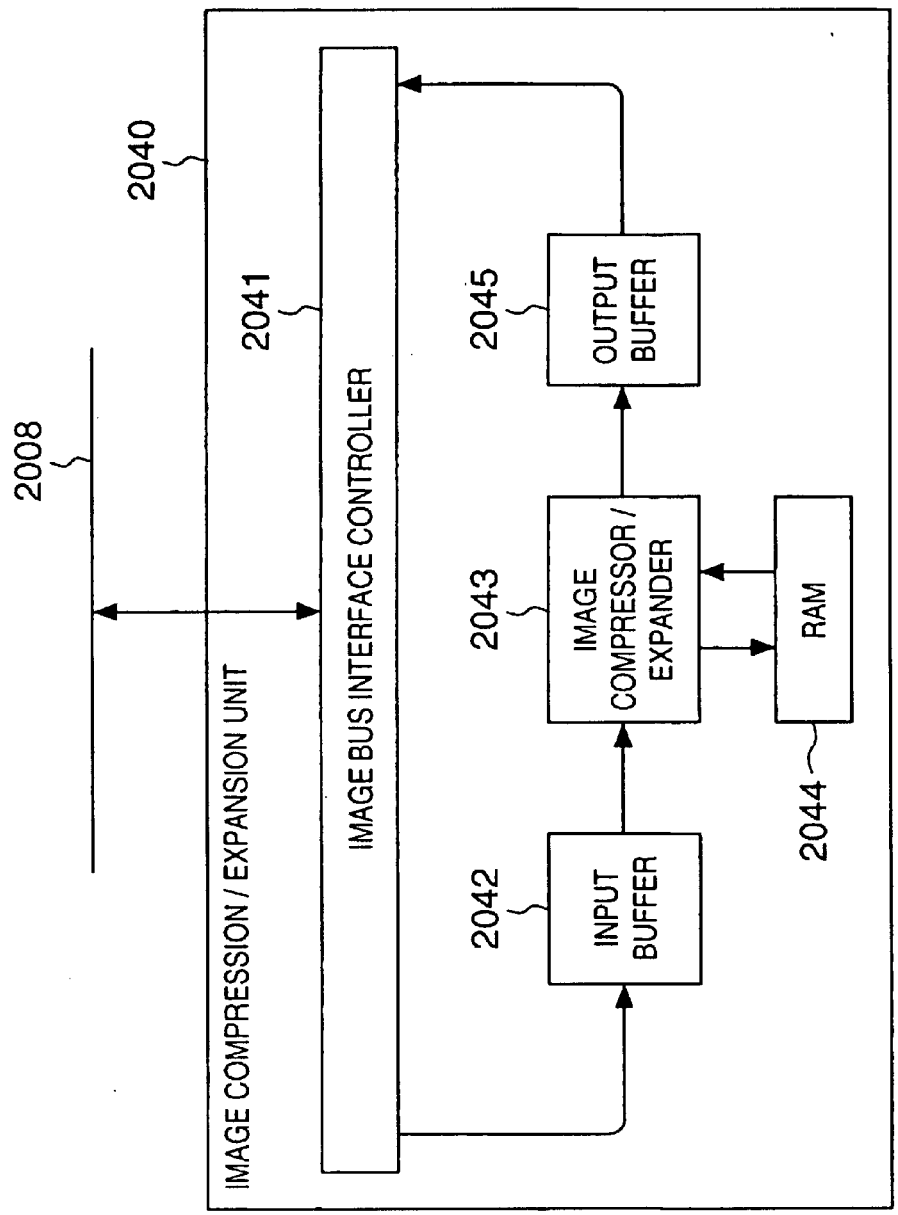
FIG. 7 is a block diagram illustrating the configuration of an image compression/expansion unit according to the embodiment of the present invention.

FIG. 7 shows the construction of the image compression/expansion unit 2040. An image bus interface controller 2041 connects to the image bus 2008 and controls the bus access sequence, controls timing for performing an exchange of data with an input buffer 2042 and output buffer 2045 and controls a mode setting with regard to an image compressor/expander 2043. Processing executed by the image compression/expansion unit 2040 will now be described.

The image bus interface controller 2041 is set up for image compression/expansion control from the CPU 2001 via the image bus 2008. In accordance with this set up, the image bus interface controller 2041 subjects the image compressor/expander 2043 to a setting necessary for image compression and expansion(e.g., MMR compression, JBIG expansion, etc.). After the necessary set-up is made, the CPU 2001 permits the image bus interface controller 2041 to transfer image data again. In accordance with such permission, the image bus interface controller 2041 starts receiving of image data from the RAM 2002 or from each device on the image bus 2008.

The image data received is stored temporarily in the input buffer 2042 and the image is transferred at a fixed speed in conformity with the image data requirement of the image compressor/expander 2043. At this time the input buffer 2042 determines whether the image data can be transferred between the image bus interface controller 2041 and the image compressor/expander 2043. In a case where it is impossible to read image data from the image bus 2008 and to write image data to the image compressor/expander 2043, the input buffer 2042 exercises control in such a manner that data is not transferred (such control is referred to as "handshake control").

The image compressor/expander 2043 stores the received image data in the RAM 2044 temporarily. The reason for this is that several lines of data are required, depending upon the type of image compression or expansion processing to be executed, when image compression is carried out. For insatance, if several lines of data are required for compressing/expading the first single line, image compression of the initial line cannot be carried out unless several lines of image data are prepared in the RAM 2044. The image data that has undergone compression or expansion is sent to the output buffer 2045 immediately.

Handshaking between the image bus interface controller 2041 and the image compressor/expander 2043 takes place in the output buffer 2045, which then transfers the image data to the image bus interface controller 2041. The latter transfers this transferred and compressed (or expanded) image data to the RAM 2002 or to each device on the image bus 2008. This series of processes is repeated until there are no longer any processing requests from the CPU 2001 (which occurs when processing of the required number of pages has ended) or until there is a halt request from the image compressor/expansion unit 2040 (as when an error occurs at the time of compression or expansion).

(Image Rotation Processor)

Figure 8:
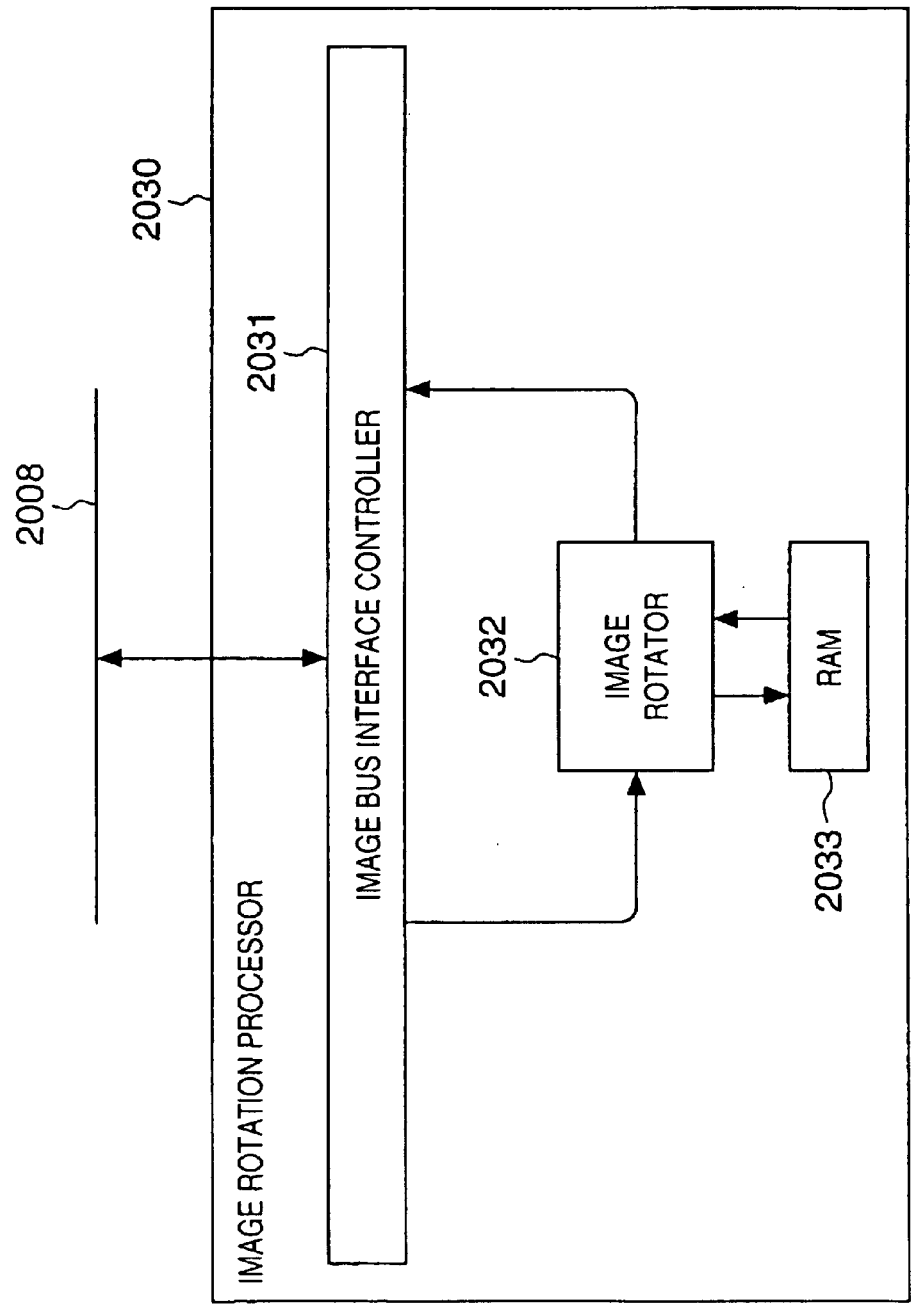
FIG. 8 is a block diagram illustrating the configuration of an image rotation processor according to the embodiment of the present invention.

FIG. 8 illustrates the construction of the image rotation processor 2030. An image bus interface controller 2031 connects to the image bus 2008 and controls the bus access sequence, controls the mode, etc., to which an image rotator 2032 is set, and controls timing for the transfer of image data to the image rotator 2032. The processing executed by the image rotator 2032 will now be described.

The image bus interface controller 2031 is set up for image rotation control from the CPU 2001 via the image bus 2008. In accordance with this set up, the image bus interface controller 2031 subjects the image rotator 2032 to settings necessary for image rotation (e.g., image size, direction and angle of rotation, etc., are set). After the necessary settings are made, the CPU 2001 permits the image bus interface controller 2031 to transmit the image data. In accordance with such permission, the image bus interface controller 2031 starts the reception of image data from the RAM 2002 or from each device on the image bus 2008. It is assumed that the width of the image bus 2008 is 32 bits, that the size of the image to be rotated is 32×32 bits, and that when the image data is transferred on the image bus 2008, the image transfer is made in units of 32 bits. (The image is assumed to be binary image.)

Figure 9:
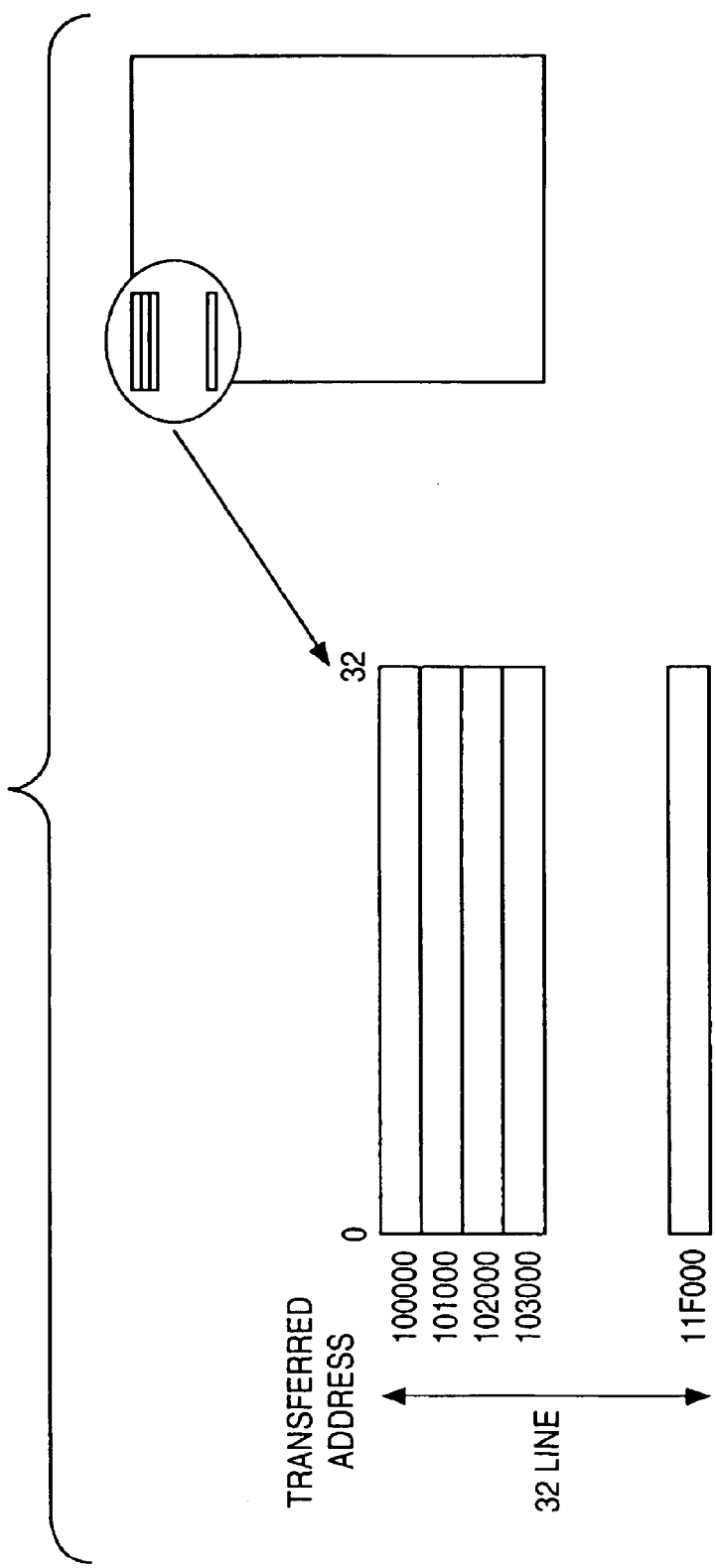
FIG. 9 is an explanatory view of image rotation processing.
Figure 10:
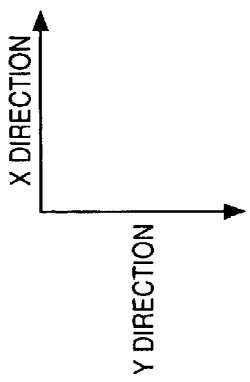
FIG. 10 is an explanatory view of image rotation processing.

In order to thus obtain an image of 32×32 bits, the above-mentioned transfer in 32-bit units must be executed 32 times and it is required that the image data be transferred from non-contiguous addresses (see FIG. 9). The image data transferred by non-contiguous addressing is written to the RAM 2033 in such a manner that it will be rotated through the desired angle when it is read out. For example, if rotation is 90° in the counter-clockwise direction, the initially transferred 32-bit image data is written in the Y direction in the manner shown in FIG. 10. At read-out, the image data is read out in the X direction, whereby the image is rotated.

Upon completion of 32×32-bit image rotation (writing to the RAM 2033), the image rotator 2032 reads the image data out of the RAM 2033 through the above-described method and transfers the image to the image bus interface controller 2031.

The image bus interface controller 2031 that has received the rotated image data transfers the data to the RAM 2002 or to each device on the image bus 2008 through contiguous addressing. This series of processes is repeated until there are no longer any processing requests from the CPU 2001 (which occurs when processing of the required number of pages has ended), or until there is a halt request from the image rotation processor 2030 (as when an error occurs at the time of rotation).

(Device Interface)

Figure 11:
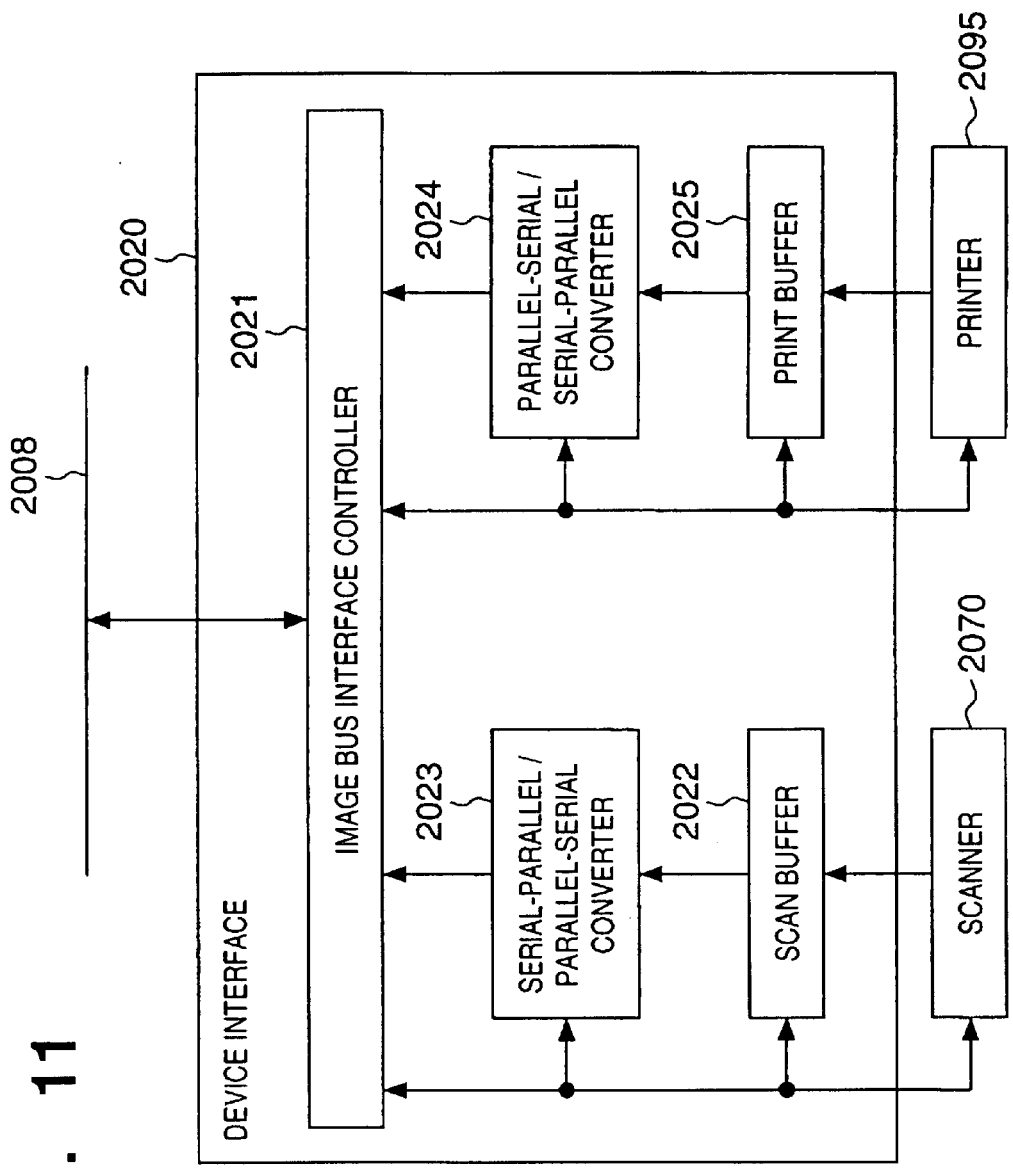
FIG. 11 is a block diagram illustrating the configuration of a device interface according to the embodiment of the present invention.

FIG. 11 illustrates the construction of the device interface 2020. An image bus interface controller 2021 connects to the image bus 2008 and controls the bus access sequence, controls each device in the device interface 2020 and generates timing. In addition, the image bus interface controller 2021 generates control signals applied to the external scanner 2070 and printer 2095. A scan buffer 2022 temporarily stores the image data sent from the scanner 2070 and outputs the synchronized image data to the image bus 2008.

The image data that has been stored in the scan buffer 2022 is placed in numerical order or disassembled by a serial-parallel/parallel-serial converter 2023, whereby there is achieved a conversion to a data width of image data capable of being transferred to the image bus 2008. Image data that has been transferred from the image bus 2008 is decomposed or placed in numerical order by a parallel-serial/serial-parallel converter 2024, whereby there is achieved a data width of image data capable of being stored in a print buffer 2025. The print buffer 2025 temporarily stores image data sent from the image bus 2008 and outputs the synchronized image data to the printer 2095.

Processing at the time of image scanning will now be described.

Image data sent from the scanner 2070 is stored in the scan buffer 2022 in sync with a timing signal sent from the scanner 2070. If, in a case where the image bus 2008 is a PCI bus, image data in excess of 32 bits has entered the buffer, 32 bits of the image data is sent from the buffer to the serial-parallel/parallel-serial converter 2023 in first-in first-out fashion, the data is thereby converted to 32-bit image data and the image data is transferred on the image bus 2008 through the image bus interface controller 2021. Further, in a case where the image bus 2008 is in compliance with IEEE 1394, the image data in the scan buffer 2022 is sent from the scan buffer 2022 to the serial-parallel/parallel-serial converter 2023 in first-in first-out fashion, the data is thereby converted to serial image data and the serial image data is transferred on the image bus 2008 through the image bus interface controller 2021.

Processing at the time of image printing will now be described.

In a case where the image bus 2008 is a PCI bus, 32-bit image data sent from the image bus 2008 is received by the image bus interface controller 2021, sent to the parallel-serial/serial-parallel converter 2024, disassembled into image data having the number of bits that can be input to the printer 2095 and then stored in the print buffer 2025. In a case where the image bus 2008 is in compliance with IEEE 1394, serial image data sent from the image bus 2008 is received by the image bus interface controller 2021, sent to the parallel-serial/serial-parallel converter 2024, converted to image data having the number of bits that can be input to the printer 2095 and then stored in the print buffer 2025. Then, in sync with a timing signal sent from the printer 2095, the image data in the buffer 2095 is sent to the printer 2095 in first-in first-out fashion.

Software
(Overall Structure of Software Block)

Figure 12:
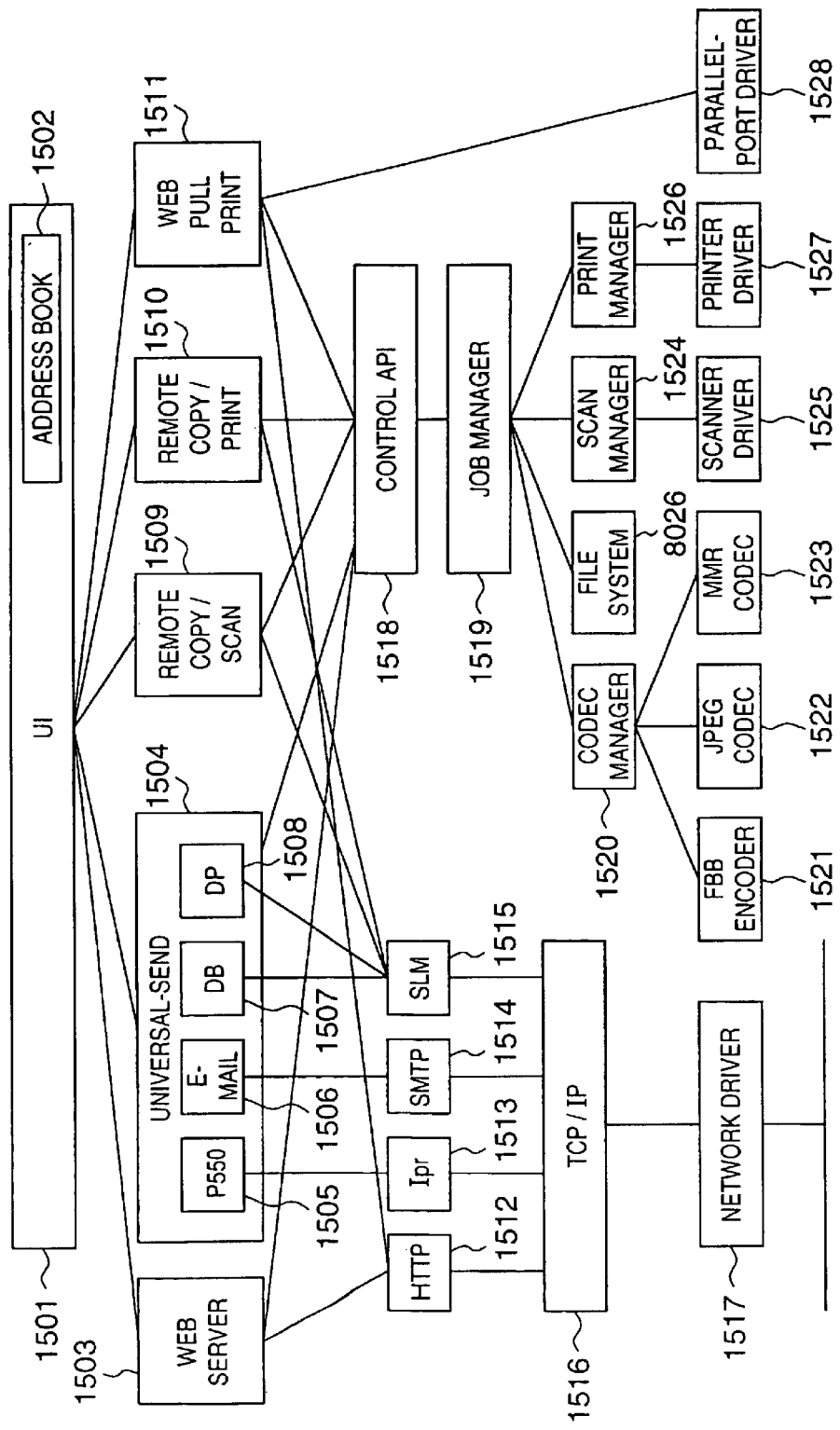
FIG. 12 is a block diagram showing the overall configuration of software installed in the image input/output apparatus according to the embodiment of the present invention.

FIG. 12 is a block diagram showing the modular structure of the software installed in the image input/output apparatus 1001 to which the present invention is applied.

A module 1501, which controls the UI (user interface), acts as the intermediary with the image input/output apparatus 1001 when a user performs various operation and settings on the apparatus 1001. This module transfers input information, requests to execute processes, and setting data in various modules, described later.

An address book module 1502 is a database module for managing the addressee and communication destination of data. Data can be added to, deleted from and acquired from the address book by an operation performed at the UI 1501, and the address book is used as means for providing each module (described below) with data address and communication-destination information in response to an operation performed by the operator.

A Web-server module 1503 is used to notify management information of the image input/output apparatus 1001 in response to a request from a Web client (not shown). The management information is acquired via a control API 1518 (described later) and notified to the Web client via an HTTP module 1512, TCP/IP communication module 1516 and network driver 1517, described later.

A universal-send module 1504 controls the distribution of data. Data that has been designated by the operator using the UI 1501 is distributed to a communication (output) destination designated by the operator in similar fashion. In a case where the generation of data to be distributed using the scanner function of the image input/output apparatus 1001 has been designated by the operator, the apparatus 1001 controls the scanner 2070 to operate via the control API 1518 (described later) and generates the data.

A module 1505 is run when the printer is designated within the universal-send module 1504 as the output destination; a module 1506 is run when an e-mail address is designated within the universal-send module 1504 as the communication destination; a module 1507 is run when a database is designated within the universal-send module 1504 as the output destination; and a DP module 1508 is run when an integrated apparatus similar to the apparatus 1001 is designated within the universal-send module 1504 as the output destination.

A remote copy/scan module 1509, which uses the scanner 2070 of the image input/output apparatus 1001 to read an image, adopts another integrated apparatus connected by a network or the like as the output destination, thereby executing processing the same as that of the copy function implemented by the image input/output apparatus 1001. A remote copy/print module 1510, which uses the printer 2095 of the image input/output apparatus 1001 to print an input image, adopts another integrated apparatus connected by a network or the like as the input source, thereby executing processing the same as that of the copy function implemented by the image input/output apparatus 1001.

A Web-pull print module 1511 reads out and prints various web-page information from the Internet or intranet.

A module 1512 is used when the image input/output apparatus 1001 communicates by HTTP. This module 1512 provides the Web-server module 1503 and Web-pull print module 1511 with communication by means of the TCP/IP communication module 1516, described below.

An Ipr module 1513 provides the printer module 1505 within the universal-send module 1504 with communication by means of the TCP/IP communication module 1516.

An SMTP module 1514 provides the e-mail module 1506 within the universal-send module 1504 with communication by means of the TCP/IP communication module 1516.

A salutation manager (SLM) module 1515 provides the database(DB) module 1507, DP module 1508 within the universal-send module 1504 and the remote copy/scan module 1509 and remote copy/print module 1510 with communication by means of the TCP/IP communication module 1516.

The TCP/IP communication module 1516 provides the above-mentioned modules with network communication by the network driver 1517.

The network driver 1517 is for controlling components physically connected to the network.

The control API 1518 interfaces modules upstream of the universal-send module 1504 with modules downstream of a job manager module 1519 (described later), etc. The control API 1518 reduces the dependency between the upstream and downstream modules and enhances the versatility of these modules.

The job manager module 1519 interprets processes specified by the various modules via the control API 1518 and applies commands to modules set forth below. These modules implement unified management of the hardware processes executed within the image input/output apparatus 1001.

A CODEC manager module 1520 manages and controls various types of compression and expansion among the processes specified by the job manager module 1519. An FBE encoder 1521 compresses, in accordance with an FBE format, data read in by scanning processing executed by the job manager module 1519 and a scan manager module 1524. A JPEG CODEC module 1522 performs JPEG compression of read data and JPEG expansion of print data in the scan processing executed by the job manager module 1519 and scan manager module 1524 and print processing executed by a print manager module 1526. An MMR CODEC module 1523 performs MMR compression of read in data and MMR expansion of print data in the scan processing executed by the job manager module 1519 and scan manager module 1524 and print processing executed by a print manager module 1526.

The scan manager module 1524 manages and controls scan processing designated by the job manager module 1519. A scanner driver 1525 is for implementing communication between the scan manager module 1524 and a scanner unit to which the image input/output apparatus 1001 is internally connected.

The print manager module 1526 manages and controls print processing designated by the job manager module 1519. A printer driver 1527 is for interfacing the print manager module 1526 and the printer 2095.

A parallel-port driver 1528 provides the interface when the Web-pull print module 1511 outputs data to an output device (not shown) via a parallel port.

(Applications)

Figure 13:
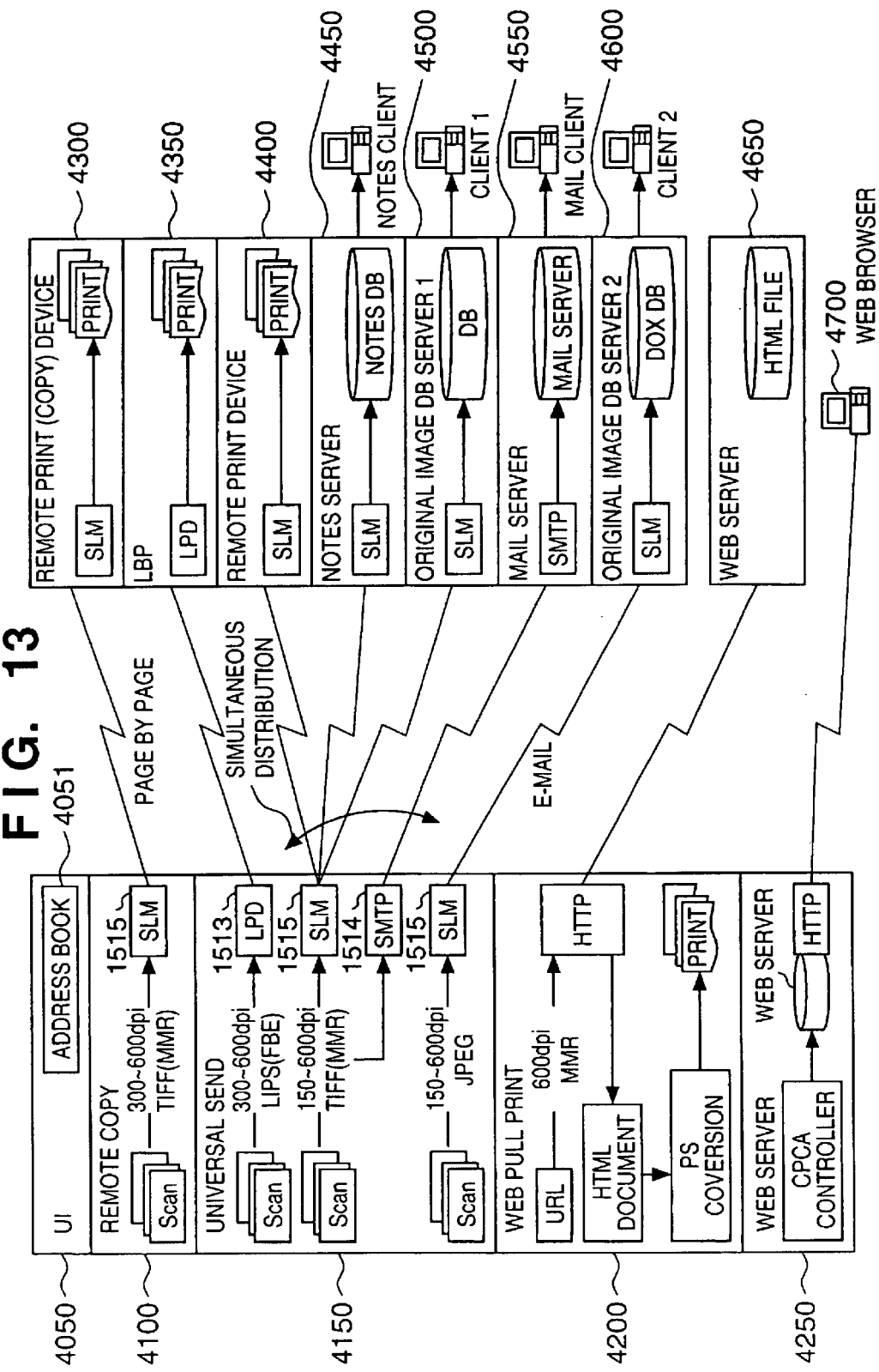
FIG. 13 is a block diagram illustrating a configuration of built-in applications of the present invention.

An embodiment of built-in applications according to the present invention will now be described with reference to the drawings. FIG. 13 is a diagram showing built-in application blocks, which relate to image-data distribution of the present invention.

The blocks include an application block 4050 of the control panel 2012 which is explained with reference to FIG. 4; an application block 4100 indicative of the transmitting side of a remote copy application; an application block 4150 indicating the transmitting side of broadcast distribution; an application block 4200 indicative of the Web pull print module; an application block 4250 indicative of the Web server module; an application block 4300 indicative of the receiving side (printing side) of the remote copy application; an application block 4350 for receiving and printing, by a general-purpose printer such as a laser beam printer (LBP), an image that has been transmitted by broadcast distribution; an application block 4400 indicative of the receiving side (printing side) of remote printing; an application block 4450 for receiving and storing an image, which has been transmitted by broadcast transmission, by a well-known Notes (registered trademark) server; an application block 4500 for receiving and storing a binary image that has been transmitted by broadcast distribution; an application block 4550 for receiving and storing an image, which has been transmitted by broadcast distribution, by a well-known mail server; and an application block 4600 for receiving and storing a multilevel image that has been transmitted by broadcast distribution. A well-known Web server 4650 includes information content, and a well-known Web browser 4700 accesses the Web server, etc.

The each application block will now be described in detail.

<<UI Application>>

The user interface (UI) 1501 is as set forth earlier with reference to FIG. 12, and the address book 1502 will be discussed here. The address book 1502 is preserved in a non-volatile storage device (non-volatile memory or hard disk, etc.) within the image input/output apparatus 1001 of the present invention. The features of the devices connected to the network are written in the address book 1502. The following items are set forth included in the address book 1502:

the formal names and aliases of the devices;
the network addresses of the devices;
the network protocols capable of being executed by the devices;
the document formats capable of being implemented by the devices;
the types of compression capable of being executed by the devices;
the image resolutions of the devices;
the paper sizes capable of being supplied and information concerning the paper supply bins in case of a printer; and
the names of folders capable of storing documents in case of a server (computer).

The applications described below are such that the features of distribution destinations are identified by information that has been written in the address book 1502.

Further, the address book 1502 is capable of being edited and makes it possible to download and use what has been stored in the server computer in the network or to refer to this information directly.

<<Remote Copy Application>>

The remote copy application identifies, from the address book 1502, information representing resolution achievable by the device specified as the distribution destination, compresses the binarized image, which has been read by the scanner in accordance with the resolution information, using well-known MMR compression, converts the format of the compressed image to the well-known TIFF (Tagged Image File Format) and then transmits the image to the printer on the network via the SLM 1515. Though the SLM 1515 will not be described in detail, suffice it to say that it is one type of network protocol that includes device control information, etc., and is referred to as a Salutation Manager (or Smart-Link Manager).

<<Broadcast Distribution Application>>

The broadcast distribution application differs from the remote copy application in that this application makes it possible to simultaneously transmit an image, obtained by a single image scan, to a plurality of distribution addresses. In addition, distribution destinations are not limited to image output devices such as printers; information can be distributed directly to so-called server computers as well.

Operation will be described in accordance with the distribution destinations.

If it is determined from the address book 1502 that the device which is the distribution destination is capable of implementing well-known LIPS functions as printer control commands in accordance with LPD (Line Printer Daemon), which is a well-known network printer protocol, then an image is read in accordance with the image resolution similarly determined from the address book 1502, the image itself is compressed using well-known FBE (First Binary Encoding) in this embodiment, the compressed image is further converted to LIPS codes and the codes are transmitted to the device at the destination by LPR, which is a well-known network printer protocol.

If the destination device of distribution is capable of communicating in accordance with SLM and is a server device, the server address and the designation of the folder within the server are determined from the address book 1502. Then, in a manner similar to that of the remote copy application, the binary image, which has been read by the scanner, can be compressed using well-known MMR compression, the format of the compressed image can be converted to the TIFF (Tagged Image File Format) and the image can be stored in a specific folder of the server device on the network via SLM 1515.

The apparatus of this embodiment is such that if the server, as the destination device, is determined to be capable of processing a multilevel image that has undergone JPEG compression, then, in a manner similar to that of the binary image mentioned above, the read multilevel image can have its format converted to the well-known JIFF using well-known JPEG compression and the image can be stored in a specific folder of the server device on the network via SLM 1515.

If the destination device of distribution is a well-known e-mail server, then the mail address written in the address book 1502 is identified, the binary image, which has been read by the scanner, is compressed using well-known MMR compression, the format of the compressed image is converted to TIFF (Tagged Image File Format) and the image is transmitted to the e-mail server using the well-known SMTP (Simple Mail Transfer Protocol) 1514. Subsequent distribution is implemented in accordance with mail server 4550.

<<Web Pull Print Application and Web Server Application>>

The Web pull print application and the Web server application are not directly related to this embodiment and explanation of them are omitted here.

Operation

Next, operations of the image input/output apparatus 1001 having the aforesaid construction are explained.

(Control Screen)

First, displayed contents on the display screen of the operation unit 2102 will be briefly explained.

Figure 14:
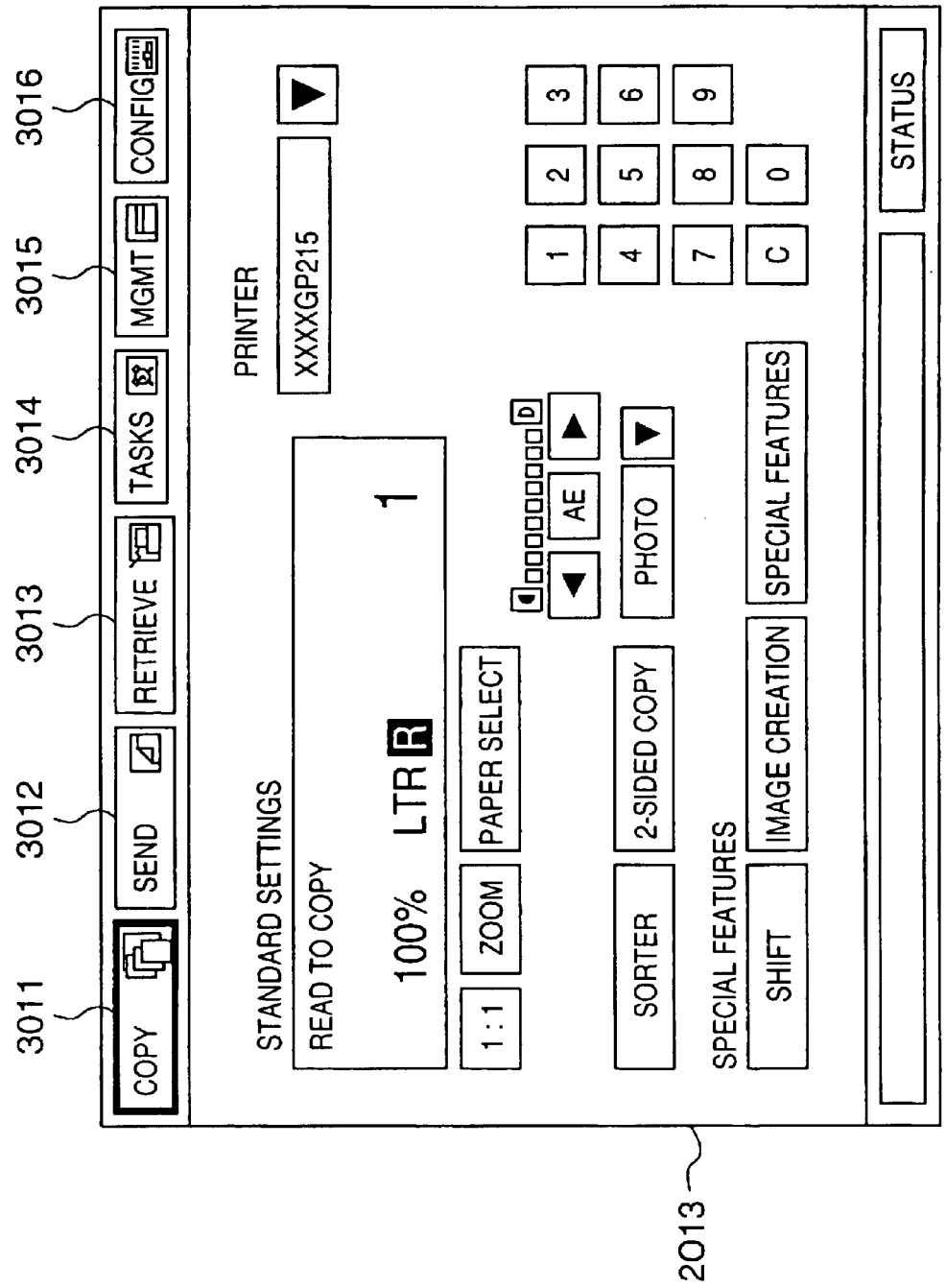
FIG. 14 is a diagram showing an operation image displayed on the control panel according to the embodiment of the present invention.

The functions provided by the image input/output apparatus of the present invention are generally categorized into six, which are COPY, SEND, RETRIEVE, TASKS, MANAGEMENT and CONFIGURATION. These functions correspond to six main tabs, which are COPY 3011, SEND 3012, RETRIEVE 3013, TASKS 3014, MGMT 3015, and CONFIG 3016 displayed at the top of the control screen 2013 in FIG. 14. A changeover to the screen of each category is performed by pressing the corresponding main tab. When a changeover to the screen of a category is inhibited, the color of the main tab corresponding to the inhibited category is displayed in a different color, and nothing happens when this main tab is pressed. FIG. 14 shows a case where COPY is selected as an example.

COPY includes a function for carrying out ordinary document copying using the scanner 2070 and printer 2095 included in the image input/output apparatus 1001, and a function for copying documents using the scanner 2070 included in the apparatus 1001 and a printer connected on the network (e.g., the printer 1040 in FIG. 1).

SEND is a function for transferring an image of a document, which has been placed in the scanner 2070 included in the apparatus 1001, by electronic mail, to a remote printer, a facsimile machine and a database, and for submitting the document to file transfer (FTP). A plurality of destinations can be specified.

RETRIEVE is a function for acquiring a document image from the outside and printing the document image using the printer 2095 included in the apparatus 1001. The WWW, electronic mail, file transfer and facsimile can be used as means for acquiring an image.

TASKS is for carrying output the generation and management of tasks for the purpose of automatically processing images sent from the outside, such as from a facsimile machine or Internet printer, and for retrieving images periodically.

MANAGEMENT (MGMT) is for managing information such as jobs, address book, bookmarks, documents and accounts.

CONFIGURATION (CONFIG) is for setting the apparatus 1001 (network configuration, clock, etc.).

(Device Information Service (DIS))

Figure 15:
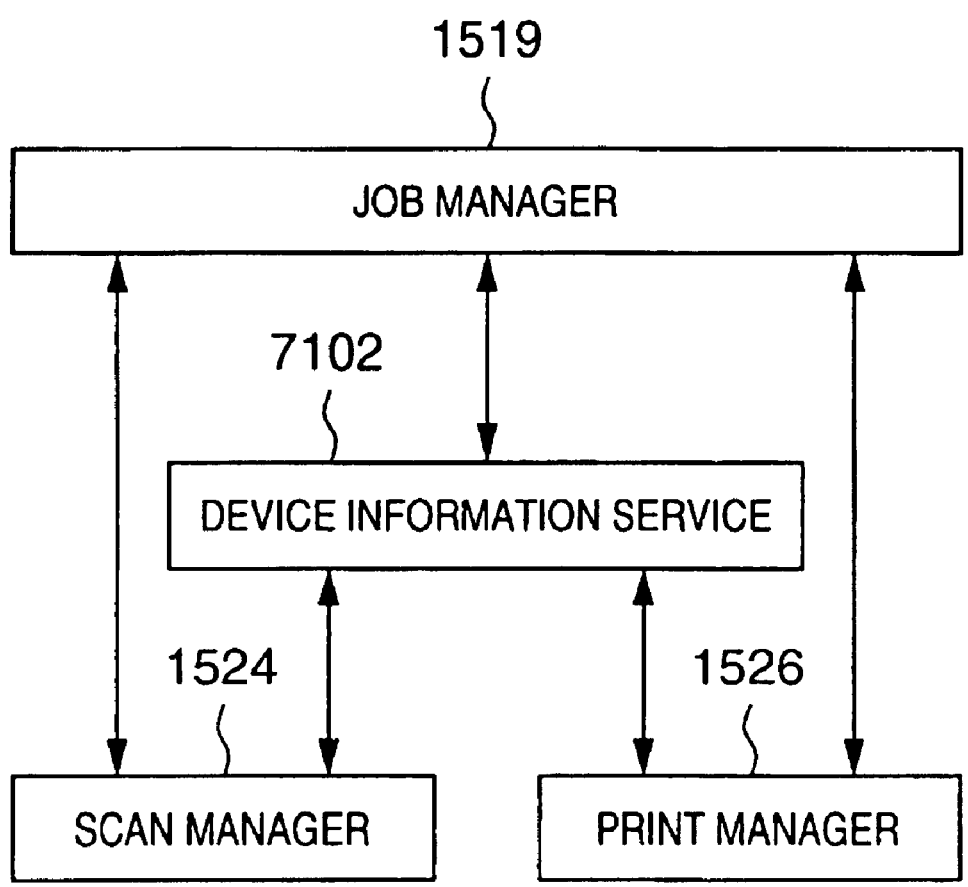
FIG. 15 is a diagram showing the connection relationship between a DIS and a job manager, print manager and scan manager.

A database which retains, in a data format in compliance with the control API, set values regarding jobs in the controller, the functions and statuses of devices (scanners, printers, etc.) and billing information, and the interface with this database are defined as a Device Information Service (DIS). FIG. 15 illustrates the communication between a DIS 7102 and the job manager 1519, the scan manager 1524 and the print manager 1526.

Basically, dynamic information such as a job start instruction is issued from the job manager 1519 directly to each manager, and static information such as device functions and job content is acquired by referring to the DIS 7102. Static and dynamic information and events from each manager are communicated to the job manager 1519 via the DIS 7102.

In a case where the setting of data in the database of the DIS from each manager and the acquisition of data are performed, the fact that the internal data format of the DIS 7102 is in compliance with Control API means that processing is executed to perform a conversion between the data format in compliance with Control API and a data format that can be understood by each manager. For example, in a case where setting of status data is performed from each manager, device-specific information is interpreted, converted to corresponding data defined by Control API and then written to the database of the DIS 7102.

In a case where the setting of data in the database of the DIS 7102 from the job manager and the acquisition of data are performed from the job manager 1519, there is no conversion of data between the job manager 1519 and the DIS 7102.

Further, updating of event data in the DIS 7102 is performed based upon each item of event information reported by each manager.

Figure 16:
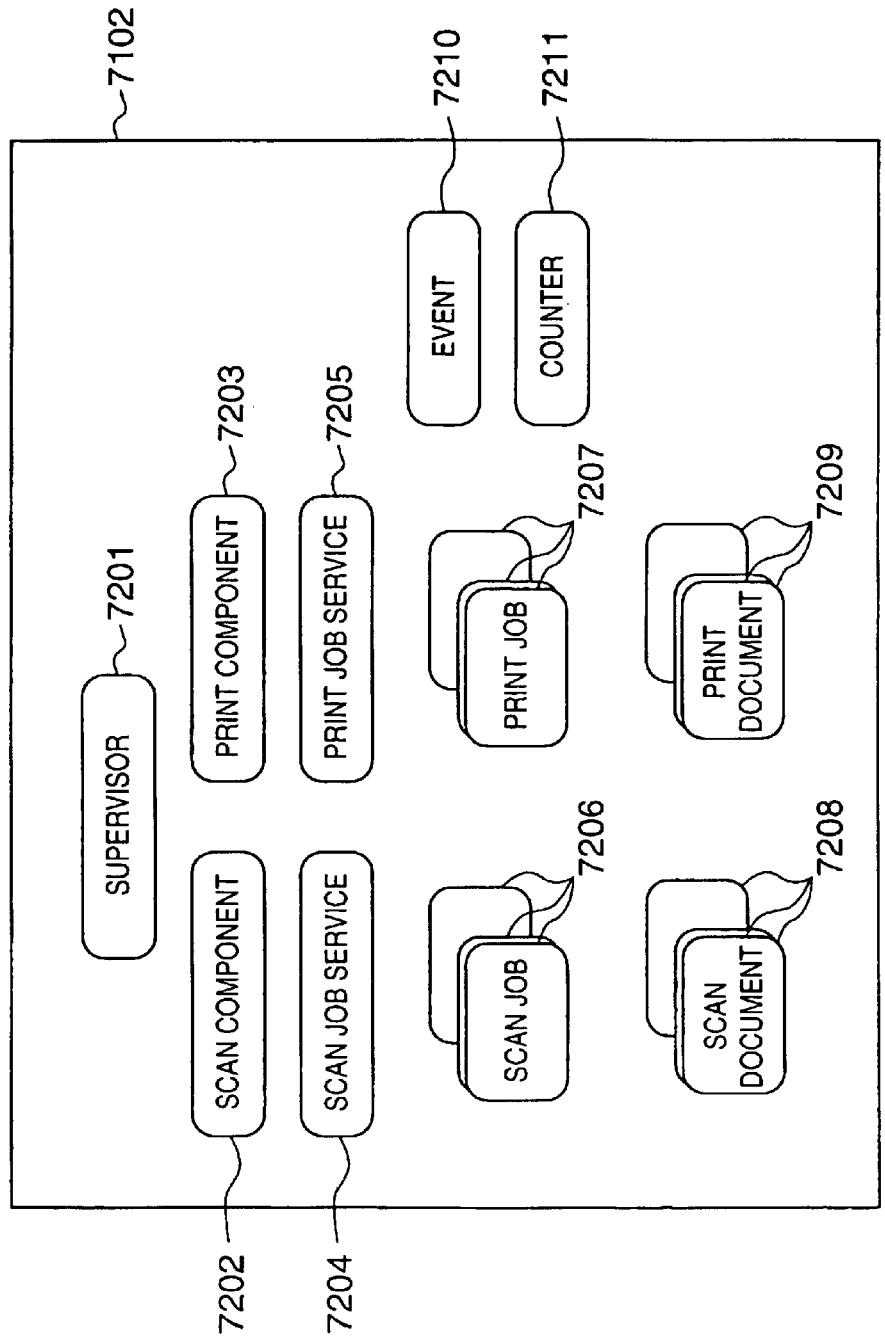
FIG. 16 is a diagram showing a database and a counter within the DIS.

FIG. 16 illustrates various databases stored in the DIS 7102. These databases will now be described.

A supervisor database 7201 stores status and user information regarding all devices. Information such as user IDs and passwords requiring back-up is stored on a hard disk or in a non-volatile storage device such as a back-up memory.

A scan component database 7202 and a print component database 7203 store data in correspondence with each existing component. For example, in case of a device comprising solely a printer, only the print component database will be present. In case of a device equipped with a facsimile function, a fax component database is provided. When initializing each component database, the corresponding manager sets the component function and status in each component database.

A scan job service database 7204 and a print job service database 7205 are provided. In a manner similar to that of the component databases, the corresponding managers set the functions capable of being used by devices and their support conditions in these job service databases when initialization is carried out.

Job databases and document databases will be described next. There are provided scan job databases 7206, print job databases 7207, scan document databases 7208 and print document databases 7209.

A job database and a document database are acquired dynamically and initialized by the job manager 1519 whenever a job and the document accompanying the job are generated. The setting of necessary items is also performed. Before the processing of a job starts, each manager reads the item necessary for processing out of the job database and document database and then starts the job. When a job subsequently ends, the databases of these jobs and their accompanying documents are released. Since a job may have more than one document, there are instances where a plurality of document databases are acquired for a certain job.

A database 7210 stores event information communicated from each manager, and a counter table 7211 is for recording the number of scans and the number of print operations of the apparatus.

Events of which notification is given by the manager include status transition of a component, scan processing completion and various errors from the scan manager, as well as status transition of a component, print processing completion, paper jam and opening of a paper cassette from the print manager. Event IDs for identifying these events are determined in advance.

If notification of an event is issued from a manager, the DIS 7102 registers the event ID issued to the event database 7210 and, if necessary, detailed data associated with the event. If cancellation of an event is communicated from a manager, the event data for which cancellation has been specified is deleted from the event database 7210.

In a case where event polling from the job manager has taken place, the DIS 7102 refers to the event database 7210 and sends back the currently occurring event ID and, if necessary, detailed data that accompanies this event. If events are not currently occurring, this fact is sent back.

If notification is given of a scan-processing complete event or print-processing complete event, the counter value of the client which has performed the scanning or printing operation is updated. In order that the value of the count based upon this software will not be lost, as when power is inadvertently cut off, the count is written back, whenever the value is updated, to a non-volatile storage device such as a backed-up memory or hard disk.

(Scanning Operation)

Figure 17:
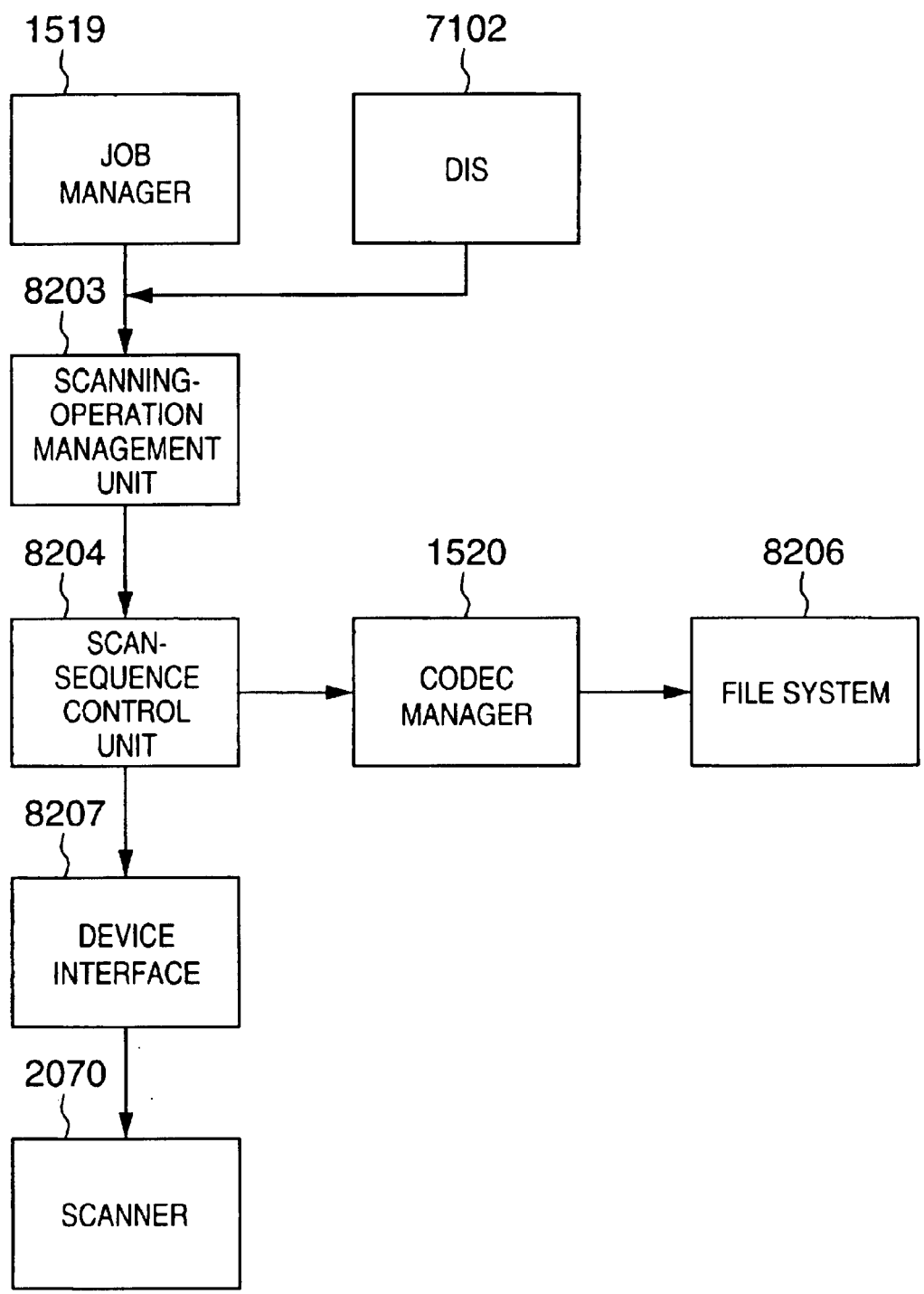
FIG. 17 is a block diagram showing software control in scanning.
Figure 18:
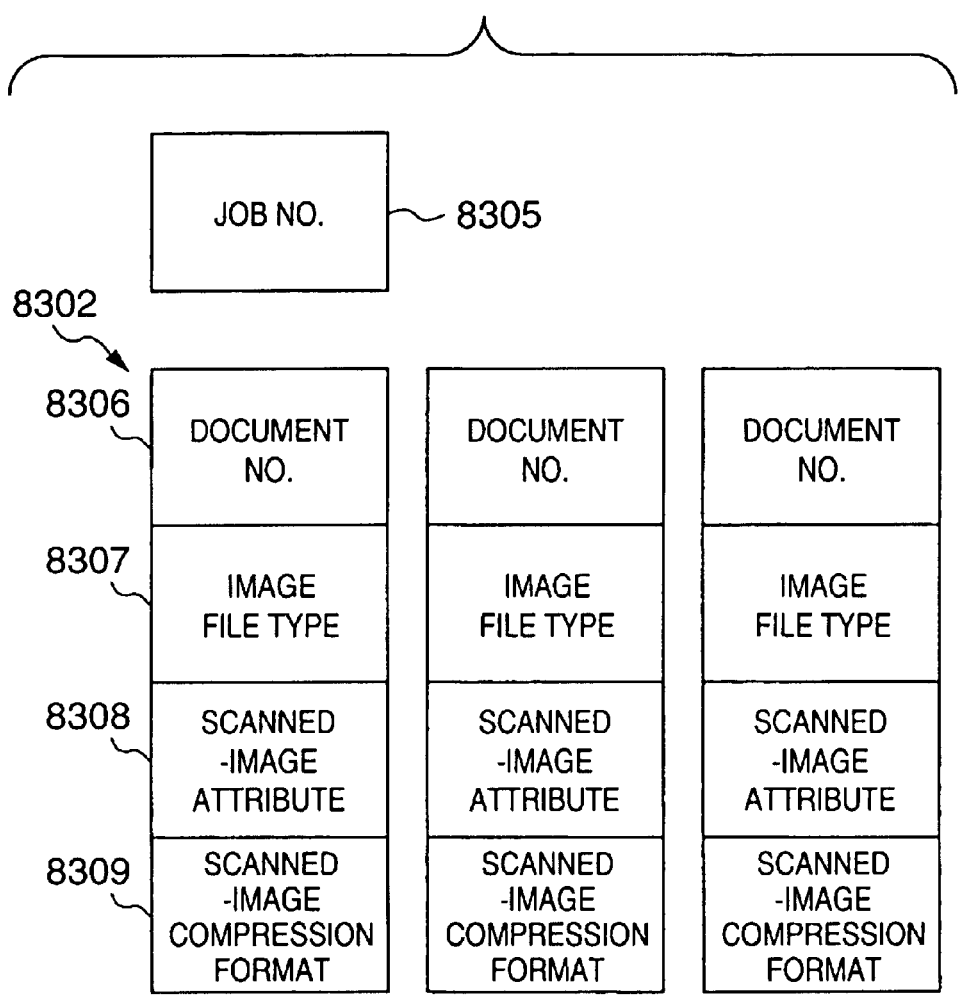
FIG. 18 is a diagrammatic view a parameter table in used in scanning.

FIG. 17 illustrates the software structure relating to scanning. The job manager 1519 has a function for classifying and storing application-level requests. The DIS 7102 stores the parameters necessary for a scanning operation from the application level. Requests from an application are stored in the RAM 2002. A scanning-operation management unit 8203 acquires information, which is necessary for scanning, from the job manager 1519 and DIS 7102. Note that the scan manager 1524 is configured with the scanning-operation management unit 8203, a scan-sequence control unit 8204 and a device interface controller 8207. The scanning-operation management unit 8203 acquires table data 8301 consisting of a job number and document number from the job manager 1519, and acquires scan parameters 8302, stored as shown in FIG. 18, from the DIS 7102 based upon the table data consisting of the job number 8305 and document number 8302. The table shown in FIG. 18 stores values when a scan job is occurred, and the job manager generates a unique document number. It should be noted that the job number 8305 in FIG. 18 is stored in the scan job database 7206 in FIG. 16, and the scan parameters 8302, such as the document number 8306, image file type 8307, scanned-image attribute 8308, and scanned-image compression format 8309 are stored in the scan document database 7208 in FIG. 16. As a result, scanning is performed based upon scan conditions requested from the application.

The scanning-operation management unit 8203 delivers the scan parameters acquired from the DIS 7102 to the scan-sequence control unit 8204 in the order of the document numbers. After receiving the scan parameters 8302, the scan-sequence control unit 8204 controls the device interface controller 8207 in accordance with the content of scanned-image attributes 8308. As a result, by operating the device interface 2020 connected to the image bus 2008 of FIG. 2, a control command is sent to the scanner 2070 via the cable 2071, whereby scanning is carried out. The scanned image is delivered to the device interface 2020 via the cable 2071 and is stored in the RAM 2002 via the bus 2008.

When scanning is completed and an image has been stored in the RAM 2002 via the bus 2008, the scan-sequence control unit 8204 sends a request to the CODEC manager 1520 in order to compress the scanned image that has been stored in the RAM 2002. Upon receiving the request, the CODEC manager 1520 uses the image compression/expansion unit 2040 connected to the bus 2008 or the software compression module in the MMR CODEC 1523 to execute compressing in accordance with the designation of a scanned-image compression format 8309 from the scan-sequence control unit 8204. The image compression/expansion unit 2040 stores the compressed image in the RAM 2002 via the bus 2008.

When the CODEC manager 1520 compresses the scanned image to the format designated by the scanned-image compression format 8309 and stores the compressed image in the RAM 2002, the scan-sequence control unit 8204 converts the compressed scanned image, which has been stored in the RAM 2002, to a file in accordance with an image file type 8307 of the scan parameters 8302. The scan-sequence control unit 8204 requests a file system 8206 to convert the image to a file format designated by the image file type 8307 of the scan parameters 8302. In accordance with the image file type 8307 from the scan-sequence control unit 8204, the file system 8206 converts the compressed image stored in the RAM 2002 to a file and transfers the file to the hard-disk drive 2004 via the bus 2008, whereby the scanned compressed image is converted to a file. When the file system 8206 has stored the image in the form of a file on the hard disk of the hard-disk drive 2004, the scan-sequence control unit 8204 sends back notification of completion of scanning to the scanning-operation management unit 8203. This indicates the completion of processing of one sheet of the document in the scanner 2070.

If a document that has not yet been scanned is present in the scanner 2070 and there is a scan request from the job manager 1519, then the scan-sequence control unit 8204 is again requested to perform scanning by using the scan parameters 8302 stored in the DIS 7102. If an unscanned document is not present in the scanner 2070, or if there is no scan request from the job manager 1519, the job manager 1519 is notified of the completion of scanning. This indicates the end of the scanning operation.

(Printing Operation)

The details of the printing operation will now be described in detail.

Figure 19:
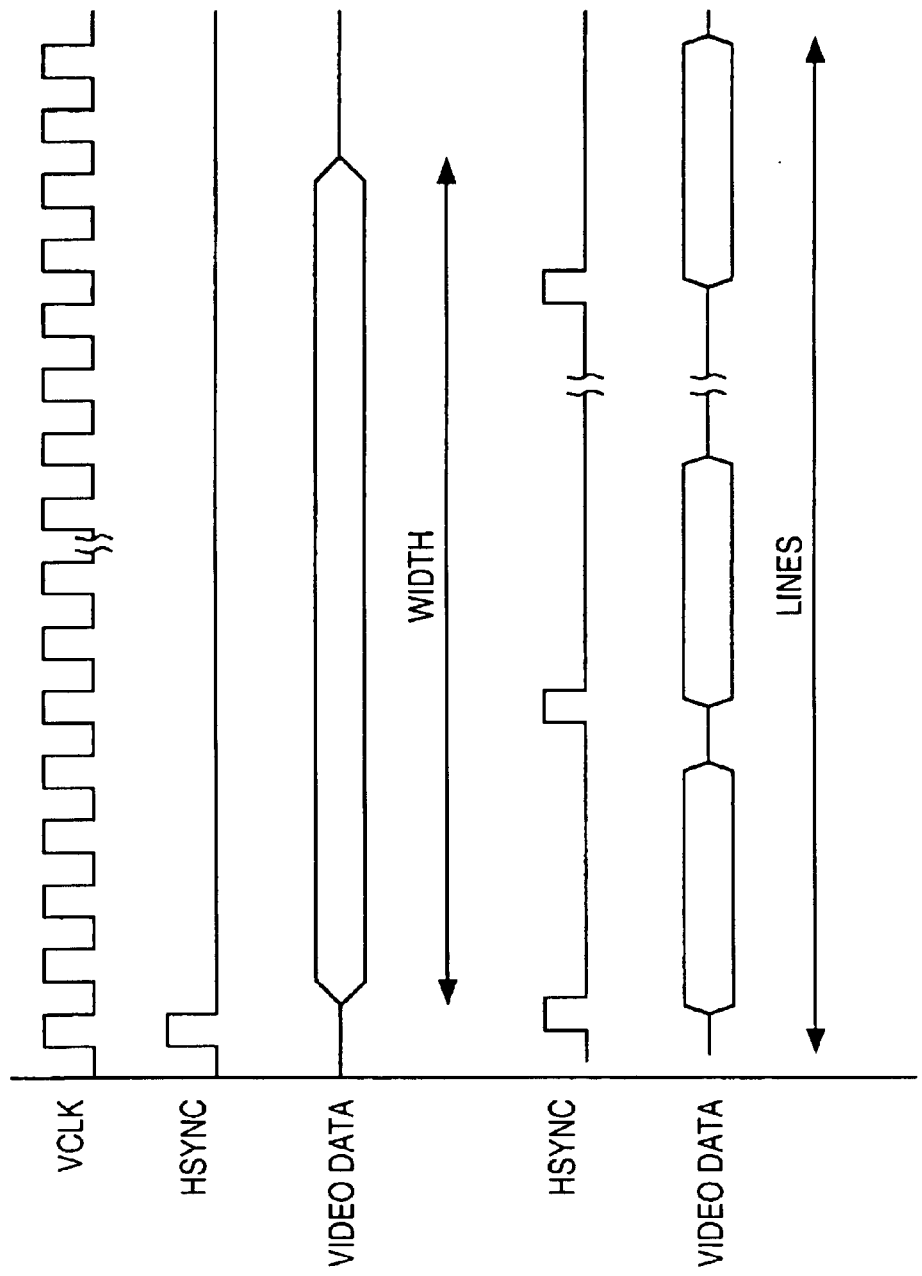
FIG. 19 is a timing chart showing transfer timing of print image data.

The device interface 2020 has an internal DPRAM and sets parameters in the printer 2095, reads out the state of the printer 2095 and exchanges printing control commands via the DPRAM. Further, this board has a video controller and transmits image data, which has been expanded on the bus 2008, to the printer 2095 via an engine interface cable in sync with VCLK (a video clock) and HSYNC supplied from the printer 2095 via the engine interface cable (cable for connecting the scanner 2070 and the controller 2000). Transmission timing is shown in FIG. 19. VCLK is produced at all times and HSYNC is applied in sync with the start of one line of printing by the printer. The video controller (not shown) reads data in an amount equivalent to the set image width (WIDTH) out of the RAM 2002 and outputs the data to the engine interface cable as a video signal. After this is repeated for the designated number of lines (LINES), the video controller generates an image-end interrupt.

As described earlier, when a print-job command is delivered to the control API 1518 from an application program run by the CPU 2001, the control API delivers this command to the job manager 1519 of the control level as a job. Furthermore, the job manager 1519 stores the job settings in the DIS 7102 and instructs the print manager 1526 to start the printing job. Upon accepting the job, the print manager 1526 reads information, which is necessary for job execution, out of the DIS 7102 and sets this information in the printer via the DPRAM. If an image has been compressed, the print manager 1526 requests the CODEC manager 1520 to expand the image. In response to this request, the CODEC manager 1520 expands the image file into a bitmap image by an expansion method (JPEG, MMR, etc.) specified by the print manager 1526. The expanded image is stored in the RAM 2002.

Figure 20:
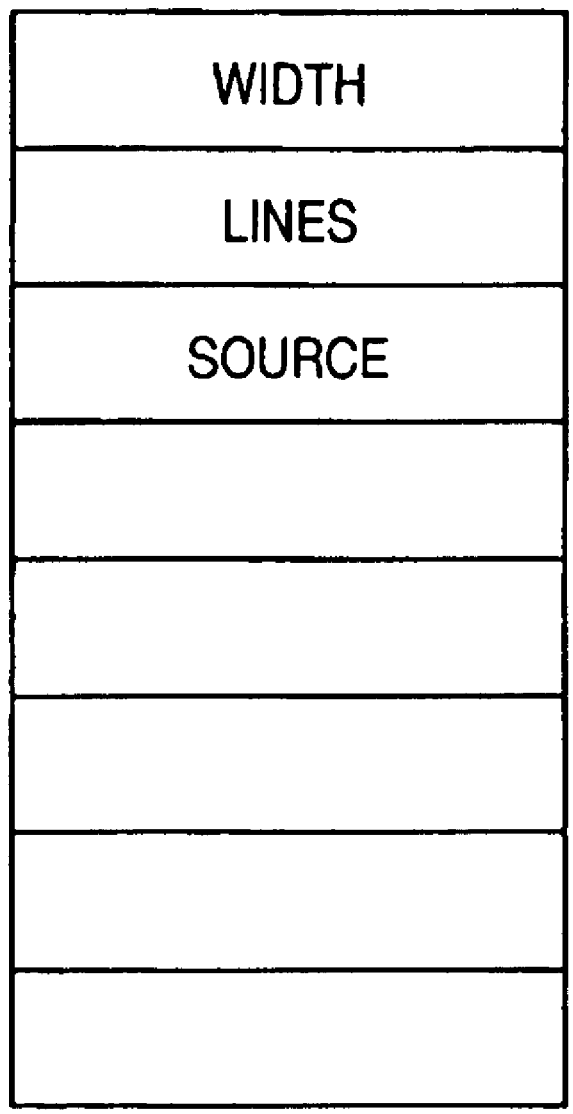
FIG. 20 is a diagram showing a print parameter matrix in an engine interface board.
Figure 21:
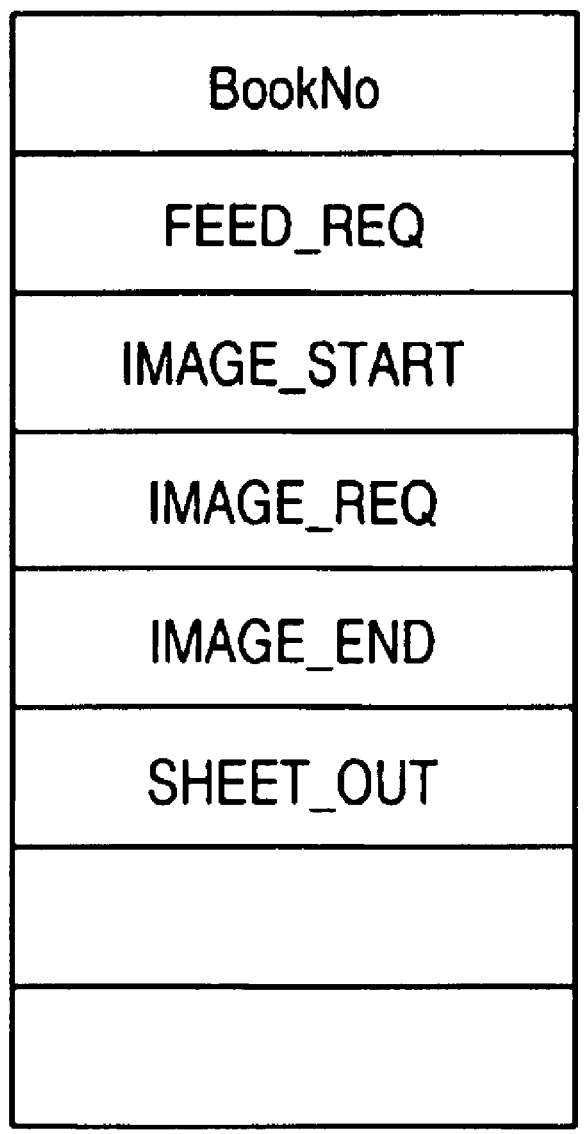
FIG. 21 is a diagram showing communication commands between a printer and the engine interface board.

The setting items of the device interface 2020 are shown in FIG. 20, and the setting items, control commands and status commands sent to the printer via the DPRAM are illustrated in FIG. 21.

Operation with regard to printing of a bitmap image will now be described in detail. It will be assumed that two pages (one copy each) of a binary image of letter size (11"×8.5") are printed using a printer having a 600-dpi capability.

When expansion of the image is finished, the print manager 1526 calculates the number of image bytes for an image of this width (8.5" in this case) as follows:

WIDTH=8.5×600÷8≈630 (bytes)

The print manager 1526 then calculates the number of lines as follows:

LINES=11×600=6600 (lines)

These calculated values and the source address of the RAM 2002 storing the image of the first page provided thereto are set at WIDTH, LINES and SOURCE shown in FIG. 20. Though preparation of the image output is completed at this point, the device interface does not output the image data because the HSYNC signal from the printer 2095 has not yet arrived (though the VCLK signal is arriving).

Next, the print manager writes 1, which is the number of copies to be output, to a prescribed address (Book No.) of the DPRAM shown in FIG. 21. The print manager 1526 thenceforth issues a paper-feed request (FEED_REQ) for output of paper for the first page and waits for a request (IMAGE_REQ) for image data from the printer 2095. When IMAGE_REQ arrives from the printer 2095, the print manager 1526 issues IMAGE START. Upon receiving IMAGE_START, the printer 2095 starts issuing HSYNC and the interface 2020, which has been waiting for HSYNC, outputs the image. Upon detecting the trailing edge of the output paper, the printer 2095 outputs a request (IMAGE_END) for termination of image data transmission. When the output paper is discharged, the printer outputs SHEET_OUT. The print manager 1526 receives IMAGE_END of the first page, sets WIDTH, LINES, SOURCE of the second page in the engine interface board, outputs a paper-feed request (FEED_REQ) and waits for an image data request (IMAGE_REQ). Operation following arrival of IMAGE_REQ of the second page is similar to that of the first page.

First Embodiment

Scanning operation that is performed when JPEG compression is executed by the scanner unit of an image input/output apparatus 1001 in the first embodiment of the present invention will be described below in detail.

Figure 22:
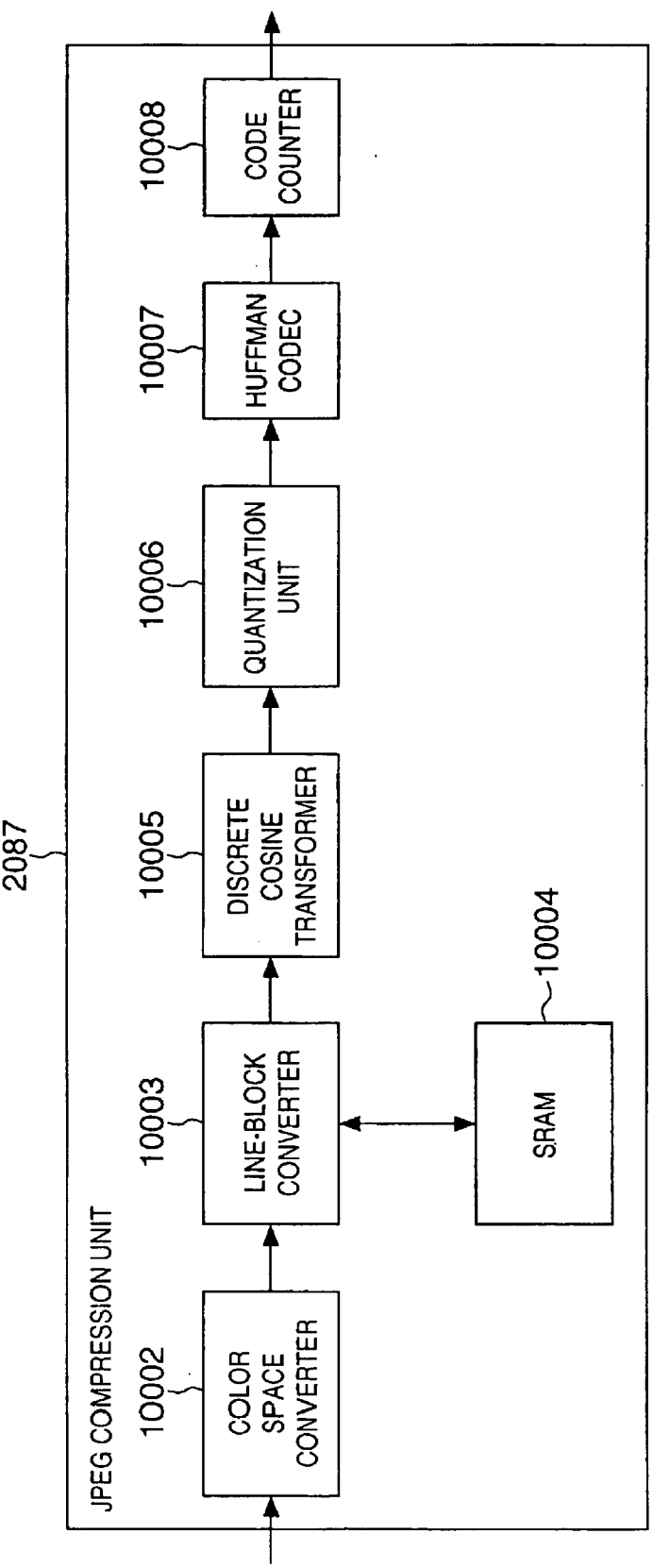
FIG. 22 is a block diagram showing the detailed arrangement of a JPEG compression unit in the first embodiment of the present invention.

The hardware arrangement will be described first with reference to FIG. 22. FIG. 22 is a block diagram showing the detailed arrangement of a JPEG compression unit 2087 (FIG. 5) in an image processor 2080. As described above, a scanned multilevel image is input to the JPEG compression unit 2087. First, this image is converted by a color space converter 10002 from the standardized RGB color space to a luminance signal Y and color difference signals UV, which are generally called YUV. This conversion may be done from the RGB color space to the luminance signal Y and color difference signals CrCb, which are called YCrCb.

A line-block converter 10003 stores image data input in units of lines in an SRAM 10004 and converts the image data of each line into 8×8 or 16×16 block data to be processed by JPEG. So-called 4:2:2 sub-sampling for color difference signals can also be performed here.

A discrete cosine transformer 10005 performs well-known discrete cosine transformation for the converted block image.

A quantization unit 10006 quantizes the image data, which has undergone discrete cosine transformation, on the basis of a quantization table stored in this quantization unit. This quantization table is set such that low-frequency components are finely quantized while high-frequency components are coarsely quantized, as exemplified in Appendix K of Recommendation T.81 issued by the ITU-T.

The quantized data is encoded by a Huffman codec 10007 using Huffman encoding.

The output Huffman code amount is counted by a code counter 10008. This counter is reset to 0 before the start of scanning and comprises a counter/register for obtaining the code amount after the image obtained by scanning is compressed.

Figure 23:
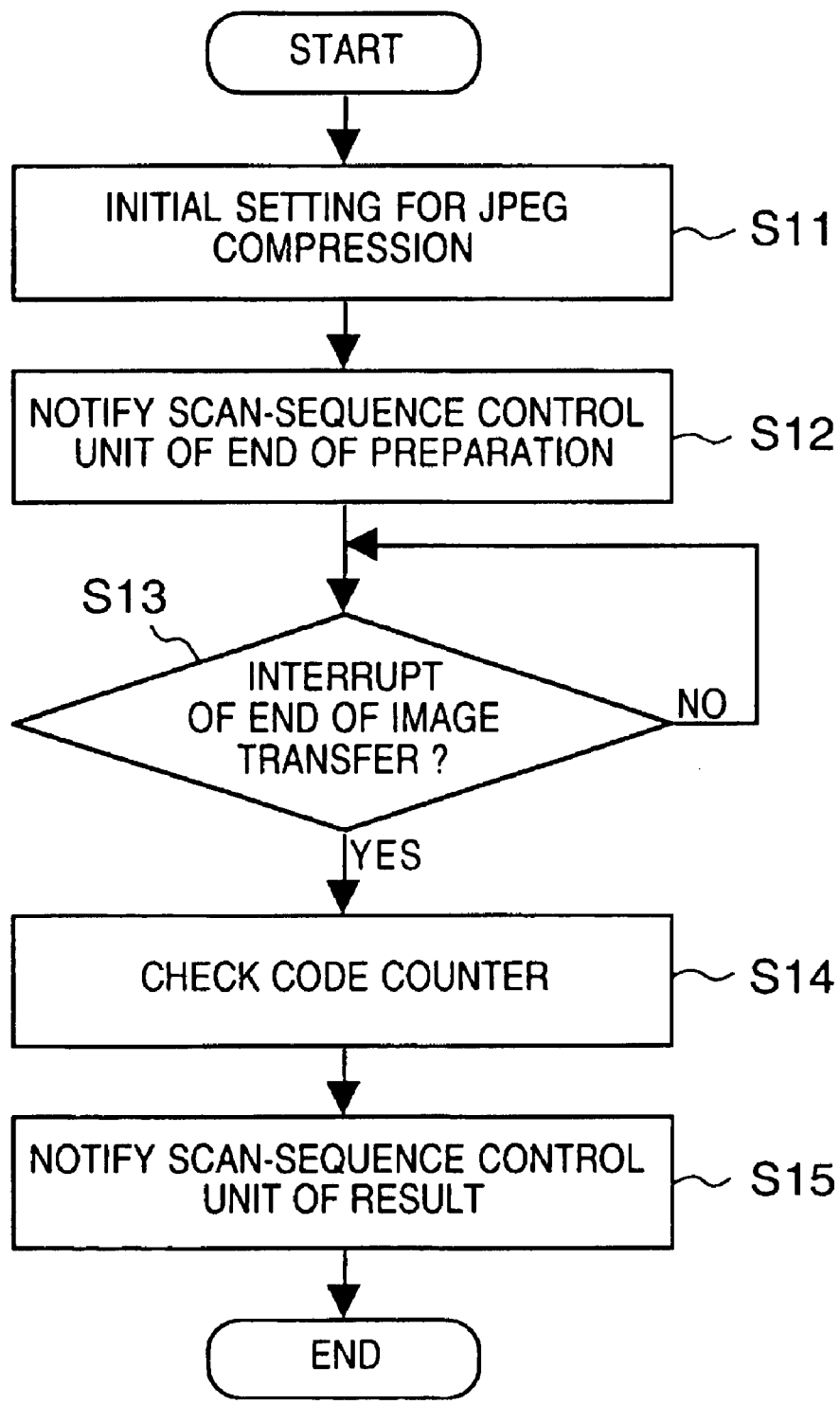
FIG. 23 is a flow chart showing the operation of a codec manager in the first embodiment of the present invention.

Operation of JPEG-compressing scanned image data in real time will be described next with reference to FIG. 23.

In scanning, a scan-sequence control unit 8204 notifies the apparatus of JPEG compression, so JPEG compression initial setting is done in step S11. In this case, the image processing hardware constructing the above-described scanner image processor 2080 is set. In addition, the color space converter 10002 and the quantization table used by the quantization unit 10006 shown in FIG. 22 are set, and the code counter 10008 is reset. The quantization table is set in accordance with a compression ratio instruction from the scan-sequence control unit 8204. As the quantization table, the table (to be referred to as "a standard quantization table" hereinafter) of ITU-T Recommendation T.81, Appendix K is basically used. A parameter QF representing a compression ratio is received from the scan-sequence control unit 8204. The value Q is calculated in accordance with this parameter QF and equations (1) and (2) below, and the standard quantization table is re-calculated and set. Examples of the equations will be shown below. The value Q takes an integer value ranging from 1 to 100. The value Q is obtained by the following equations, and each element of the quantization table is multiplied by Q/100. When the quantization step exceeds 255, it is clipped at 255.

$$Q=5000/QF \text{ (when } QF<50) \qquad (1)$$

$$Q=200-QF \times 2 \text{ (when } QF \geq 50) \qquad (2)$$

The start address of the memory ensured by the scan-sequence control unit 8204, and the ensured memory capacity are set in an image bus interface controller 2081. The image bus interface controller 2081 decrements the ensured memory capacity, and when the capacity becomes 0, the transfer is stopped. For this reason, the image is not written beyond the ensured memory capacity.

When setting of the image processing hardware is ended, the scan-sequence control unit 8204 is notified of completion of preparation in step S12. A codec manager 1520 notifies the scan-sequence control unit 8204 of the completion of preparation after the image processing hardware is activated to transfer an image. However, at this time point, no image is transferred. Actually, a sync signal of image data is output from a scanner 2070 when the scan-sequence control unit 8204 instructs the scanner 2070 to start scanning, and scanning starts. The sync signal triggers image transfer to the memory. The codec manager 1520 is notified of the end of image transfer through an interrupt signal from the image bus interface controller 2081 and an interrupt handler for that interrupt (step S13). If no interrupt is received, it is continuously waited. When an interrupt is received, it is determined whether the image data is completely stored in the memory area prepared by the scan-sequence control unit 8204 in advance. The codec manager 1520 can know the size of the ensured memory area by a notification from the scan-sequence control unit 8204. The code amount of the actually compressed image can be obtained from the code counter 10008. In step S14, the two values are compared. If the actual compressed code data amount exceeds the size of the ensured memory area, the scan-sequence control unit 8204 is notified of the failure of scan data storage and the code data amount in step S15. Otherwise, the scan-sequence control unit 8204 is notified of the success of scan data storage.

Figure 24:
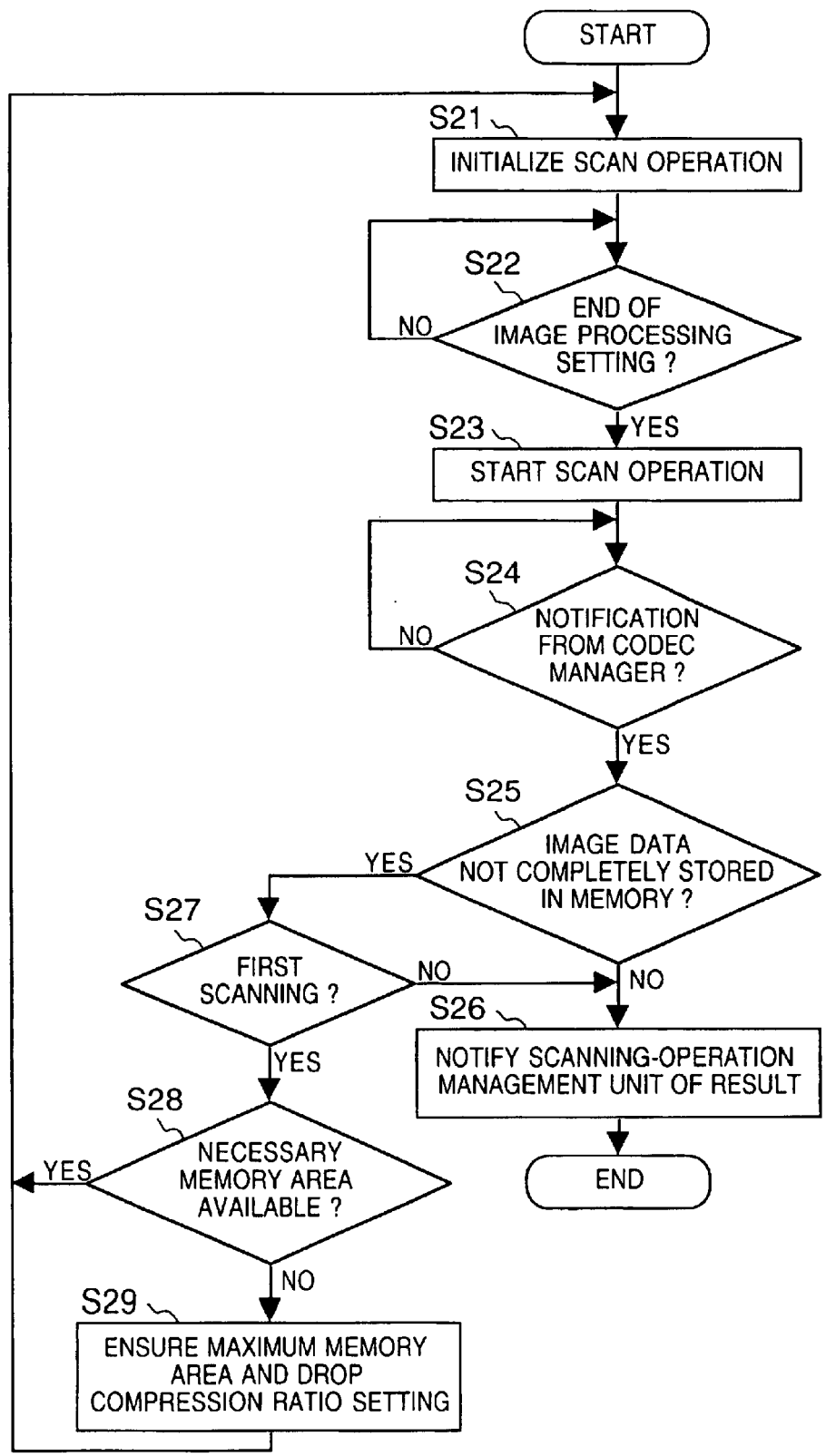
FIG. 24 is a flow chart showing the operation of a scan-sequence control unit in the first embodiment of the present invention.

The operation of the scan-sequence control unit 8204 will be described next with reference to the flow chart shown in FIG. 24.

In step S21, before scanning, the scanner 2070 is initialized. In this case, the memory area for holding image data after JPEG compression is ensured, and the codec manager 1520 is requested to set the image processing hardware for JPEG compression. The initially ensured memory area capacity is obtained by calculation using the compression ratio parameter QF and image size. For the compression ratio parameter QF, an instruction is issued by user setting, and a value complying with it is instructed. FIG. 25 is a table showing the user settings, parameters QF, and equations therefor.

In step S22, processing waits for the end of image processing hardware setting by the codec manager 1520. When setting is ended, the scanner 2070 is instructed to start scanning operation in step S23. In step S24, processing waits until a notification of the end of image transfer is received from the codec manager 1520. When a notification is received, and the image data is completely stored in the memory area prepared by the scan-sequence control unit 8204 (NO in step S25), the flow advances to step S26 to notify a scanning-operation management unit 8203 of the result, and the processing is ended. If the image data is not completely stored (YES in step S25), the flow advances to step S27 to determine whether it is the first scanning for a single original. If the scanning is in the second or subsequent cycle, the scanning-operation management unit 8203 is notified of the failure of scan image reception in step S26. This information is displayed on the control unit 2012 through the job manager 1520 or an application requested for the job, and the user is notified of it.

If scanning is in the first cycle (YES in step S27), settings are changed, and scanning is tried again. More specifically, first, the necessary memory size the codec manager 1520 notified is referred to. If an extra memory area of about 5% can be ensured in addition to the necessary memory size (YES in step S28), the memory area is ensured, and the flow returns to step S21 to perform initial setting again. If the necessary memory area cannot be ensured (NO in step S28), the maximum memory area available is ensured in step S29, and the compression ratio setting is dropped by one step, and initial setting is done in step S21.

As described above, in the first embodiment of the present invention, in re-scanning as performing JPEG compression, the necessary memory capacity is measured in the first scanning. On the basis of the measured capacity, if the necessary memory area cannot be acquired, the maximum memory area available is ensured, and scanning is performed while the compression ratio setting is automatically dropped by one step. Hence, the image JPEG-compressed in the second scanning can be stored in the memory, and user's operability of the apparatus can be improved.

Second Embodiment

The second embodiment will be described.

Scanning operation that is performed when JPEG compression is executed by the scanner unit of an image input/output apparatus 1001 in the second embodiment of the present invention will be described below in detail. The operation of the codec manager 1520 is the same as that described in the first embodiment with reference to FIG. 23, and a detailed description thereof will be omitted.

Figure 26:
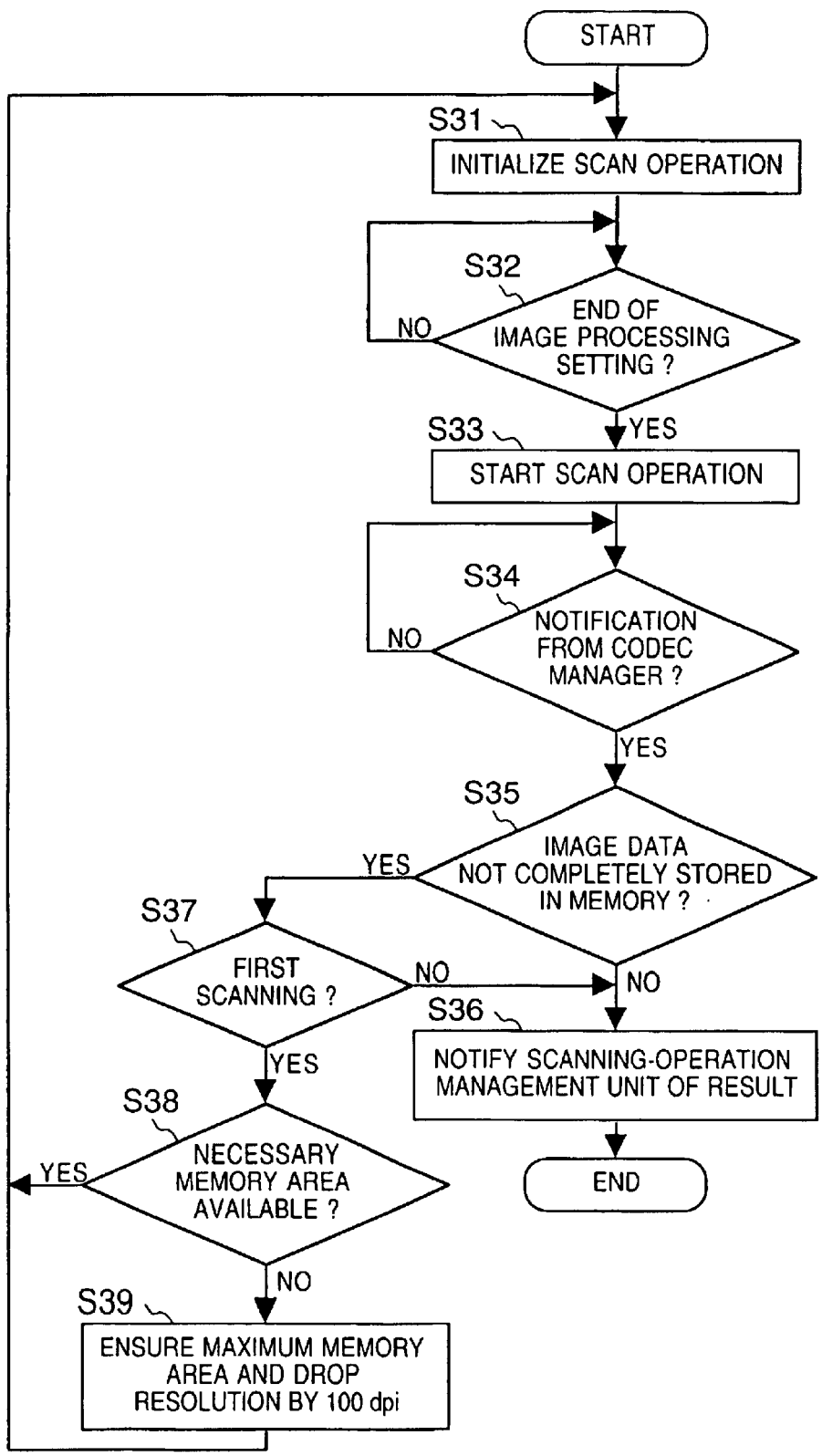
FIG. 26 is a flow chart showing the operation of a scan-sequence control unit in the second embodiment of the present invention.

The operation of a scan-sequence control unit 8204 in the second embodiment will be described with reference to the flow chart shown in FIG. 26.

In step S31, before scanning, the scanner 2070 is initialized. In this case, the memory area for holding image data after JPEG compression is ensured, and the codec manager 1520 is requested to set the image processing hardware for JPEG compression. The initially ensured memory area capacity is obtained from the image size. Sine a compression ratio of about $\frac{1}{10}$ the image size can easily be obtained by JPEG, a memory capacity corresponding to (image size×$\frac{1}{10}$) is acquired.

In step S32, processing waits for the end of image processing hardware setting by the codec manager 1520. When setting is ended, the scanner 2070 is instructed to start scanning operation in step S33. As the resolution, that instructed by a control unit 2012 is used if it is the first scanning. In step S34, processing waits until a notification of the end of image transfer is received from the codec manager 1520. When a notification is received, and the image data is completely stored in the memory area prepared by the scan-sequence control unit 8204 (NO in step S35), the flow advances to step S36 to notify the scanning-operation management unit 8203 of the result, and the processing is ended. If the image data is not completely stored (YES in step S35), the flow advances to step S37 to determine whether it is the first scanning for a single original. If the scanning is in the second or subsequent cycle, the scanning-operation management unit 8203 is notified of the failure of scan image reception in step S36. This information is displayed on the control unit 2012 through the job manager 1520 or an application requested for the job, and the user is notified of it.

Figure 27:
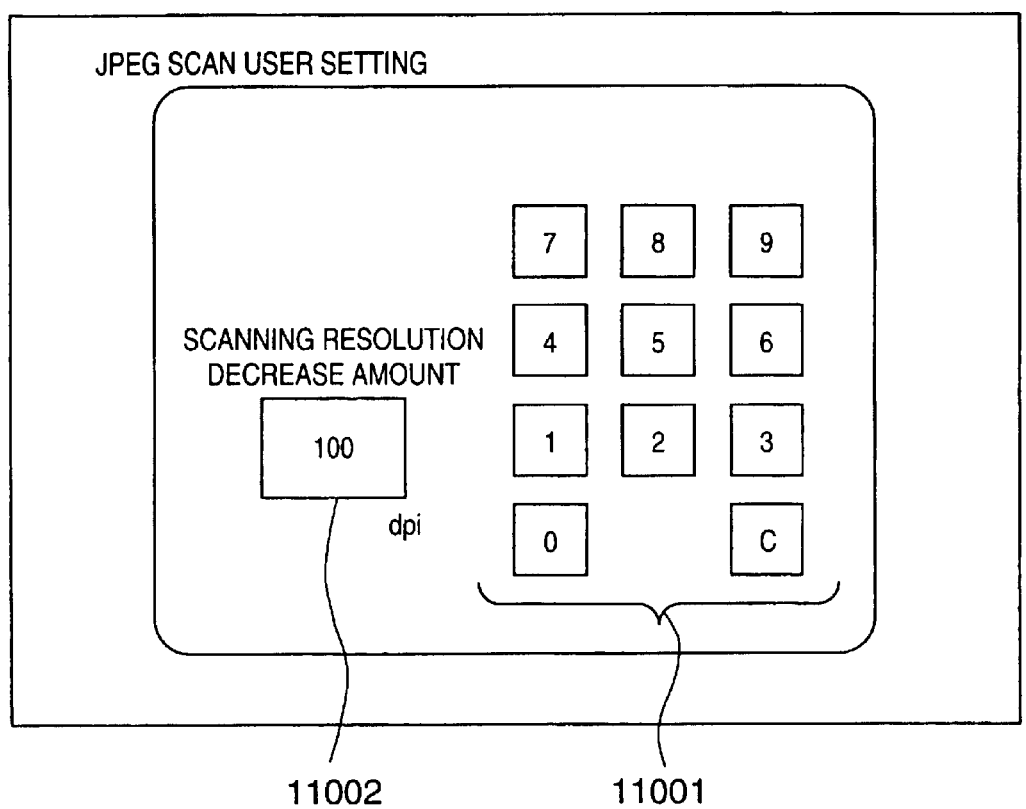
FIG. 27 is a view showing a resolution setting window in scanning where JPEG compression is executed in real time in the second embodiment of the present invention.

If scanning is in the first cycle (YES in step S37), settings are changed, and scanning is tried again. More specifically, first, the necessary memory size the codec manager 1520 notified is referred to. If an extra memory area of about 5% can be ensured in addition to the necessary memory size (YES in step S38), the memory area is ensured, and the flow returns to step S31 to perform initial setting again. If the necessary memory area cannot be ensured (NO in step S38), the maximum memory area available is ensured in step S39, and the scanning resolution setting is dropped by 100 dpi. For example, when the setting by the control unit is 400 dpi, initial setting is performed in step S31 such that the resolution is dropped to 300 dpi for scanning. The manner the resolution is dropped may be set by the user himself/herself using the user mode window shown in FIG. 27. In accordance with the user mode setting, the scan-sequence control unit sets the resolution again and rescans. For input, the decrease amount of the resolution is input to a box 11002 using a ten-key pad 11001.

In the second embodiment, the method of changing the scanning resolution itself has been described. However, even when the sampling rate for the color difference signals is changed to 4:4:4, 4:2:2, or 4:1:1 by a line-block converter 10003, the same effect as described above can be obtained.

As described above, in the second embodiment, in re-scanning for JPEG compression that is executed simultaneously with scanning in real time, the necessary memory capacity is measured by the first scanning. On the basis of the measured capacity, if the necessary memory area cannot be acquired, the maximum memory area available is ensured, and scanning is performed while the scanning ratio is automatically dropped. Hence, the image JPEG-compressed in the second scanning can be stored in the memory, and user's operability of the apparatus can be improved.

Third Embodiment

The third embodiment will be described.

Scanning operation that is performed when JPEG compression is executed by the scanner unit of an image input/output apparatus 1001 in the third embodiment of the present invention will be described below in detail. The operation of the codec manager 1520 is the same as that described in the first embodiment with reference to FIG. 23, and a detailed description thereof will be omitted.

Figure 28:
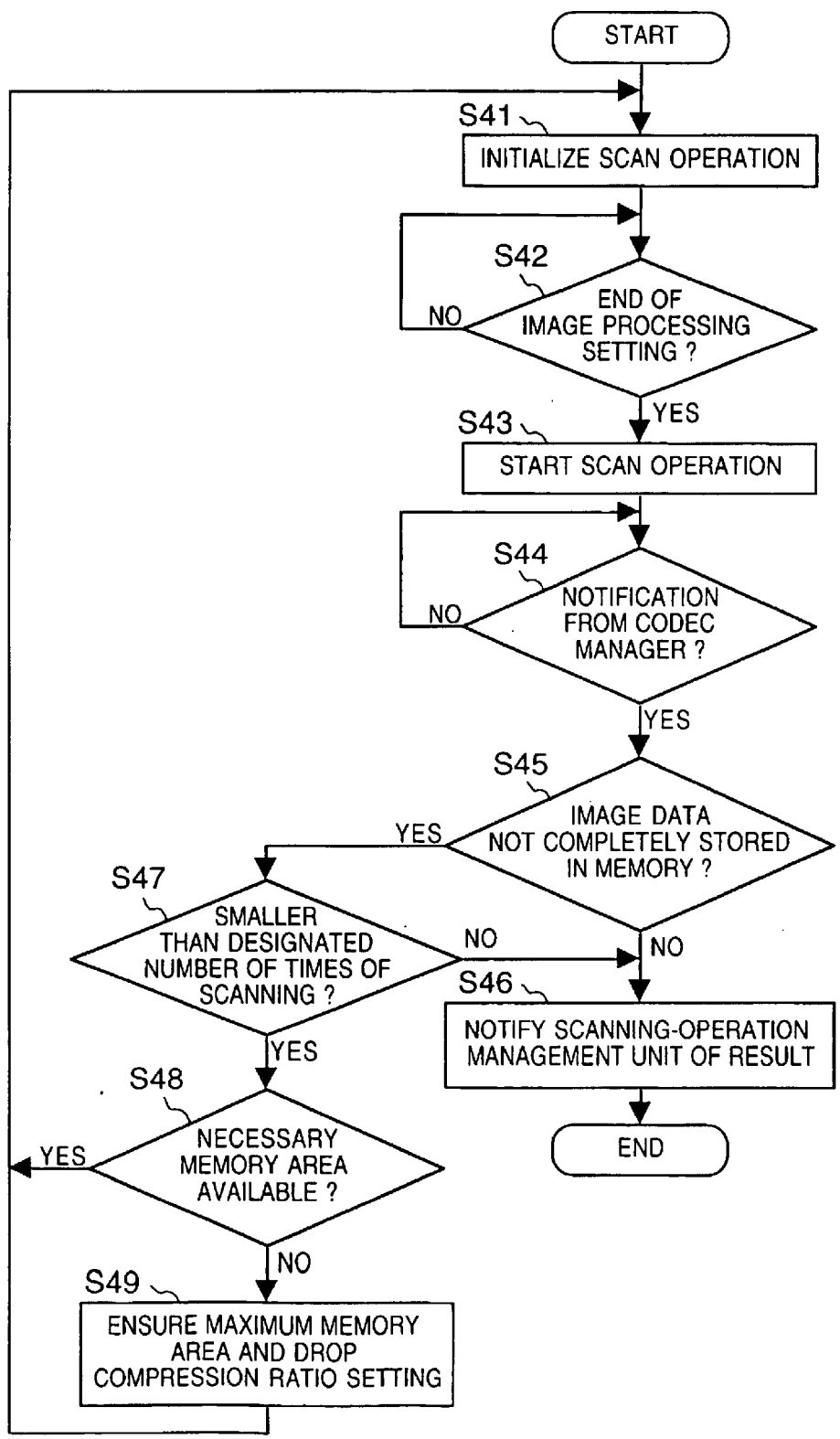
FIG. 28 is a flow chart showing the operation of a scan-sequence control unit in the third embodiment of the present invention.

The operation of a scan-sequence control unit 8204 in the third embodiment will be described with reference to the flow chart shown in FIG. 28.

In step S41, before scanning, the scanner 2070 is initialized. In this case, the memory area for holding image data after JPEG compression is ensured, and the codec manager 1520 is requested to set the image processing hardware for JPEG compression. In addition, the maximum number of times of re-scanning (maximum number of times of scanning operations) when the compressed image cannot be completely stored in the ensured memory area is instructed by the control unit 2012. The initially ensured memory area capacity is obtained by calculation using a compression ratio parameter QF and image size. For the compression ratio parameter QF, an instruction is issued by user setting, and a value complying with it is instructed. FIG. 25 is a table showing the user settings, parameters QF, and equations therefor.

In step S42, processing waits for the end of image processing hardware setting by the codec manager 1520. When setting is ended, the scanner 2070 is instructed to start scanning operation in step S43. In step S44, processing waits until a notification of the end of image transfer is received from the codec manager 1520. When a notification is received, and the image data is completely stored in the memory area prepared by the scan-sequence control unit 8204 (NO in step S45), the flow advances to step S46 to notify a scanning-operation management unit 8203 of the result, and the processing is ended. If the image data is not completely stored (YES in step S45), the flow advances to step S47 to determine whether it is scanning operation within the designated scanning cycles for a single original. If the scanning is in a subsequent cycle of the designated scanning cycles, the scanning-operation management unit 8203 is notified of the failure of scan image reception in step S46. This information is displayed on the control unit 2012 through the job manager 1520 or an application requested for the job, and the user is notified of it.

Figure 29:
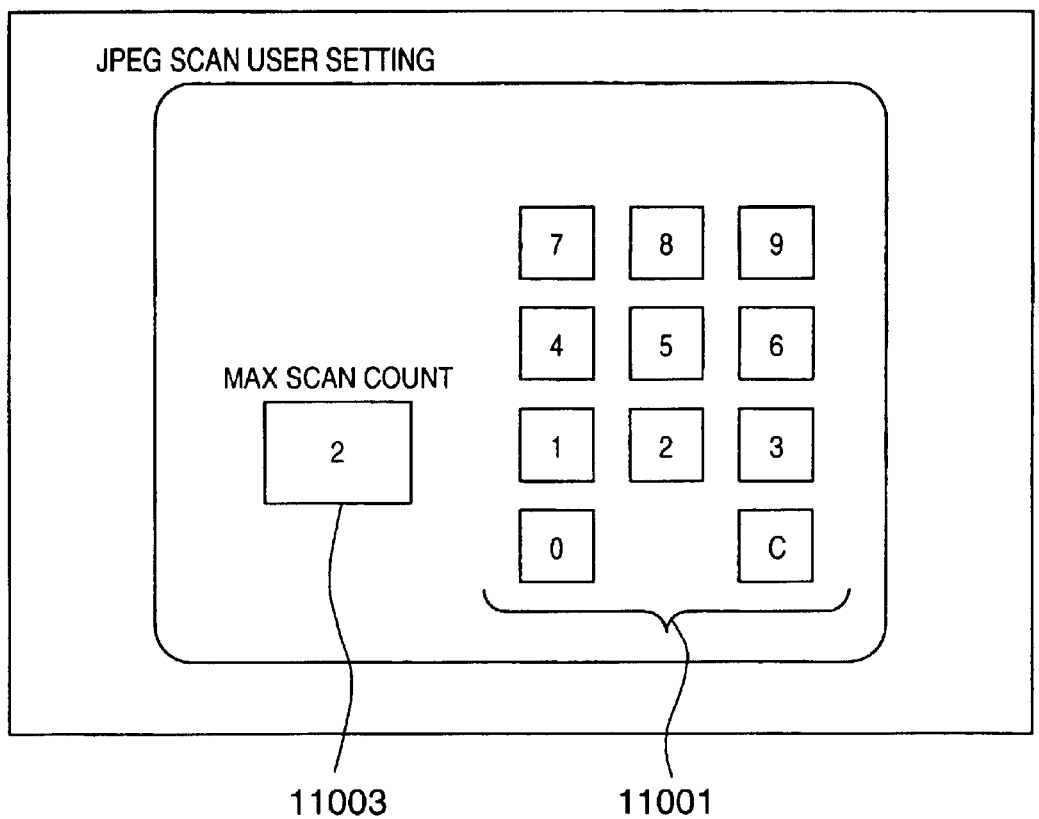
FIG. 29 is a view showing a control unit setting window in scanning where JPEG compression is executed in real time in the third embodiment of the present invention.

FIG. 29 is a view showing the setting window. The number of times of scanning is set in a setup box 11003 using a ten-key pad 11001. Scanning operation is allowed to be repeated within the set number of times.

If the number of times of scanning is less than the designated number of times (YES in step S47), settings are changed, and scanning is tried again. More specifically, first, the necessary memory size the codec manager 1520 notified is referred to. If an extra memory area of about 5% can be ensured in addition to the necessary memory size (YES in step S48), the memory area is ensured, and the flow returns to step S41 to perform initial setting again. If the necessary memory area cannot be ensured (NO in step S48), the maximum memory area available is ensured in step S49, and the compression ratio setting is dropped by one step, and initial setting is done in step S41. "One step" means a step settable by the user through the control unit 2012, or the compression ratio parameter QF held by the scan-sequence control unit 8204.

In the third embodiment, when the compressed scan image is stored in the ensured memory area, the processing is ended even when the number of times of scanning performed is less than the designated number of times.

As described above, in the third embodiment of the present invention, since the user can set an arbitrary number of times as a maximum scan count through the control unit, in addition to the effect obtained in the first embodiment, an image JPEG-compressed by a plurality of number of times of scanning can be stored in the memory, and user's operability of the apparatus can be improved.

In the first to third embodiments, JPEG compression has been described. However, the present invention is not limited to this. The same effect as described above can be obtained when the present invention is used to compress image data in real time by variable-length encoding.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts in FIGS. 23 and 24, 26 or 28 described in the embodiments.

As many apparently widely different embodiments of the present invention can be made without departing from the spirit and scope thereof, it is to be understood that the invention is not limited to the specific embodiments thereof except as defined in the appended claims.

What is claimed is:

1. A control method for an image input apparatus for reading an original and compressing image data of the read original in real time, said method comprising:
   ensuring a memory area for storing compressed image data;
   reading an original and outputting image data;
   compressing the image data in real time;
   storing the compressed image data in the memory area ensured in said memory area ensuring step;
   determining whether the compressed image data is completely stored in the memory area; and
   changing a compression ratio,
   wherein the changing of the compression ratio is performed when the compressed image data is not completely stored in the ensured memory area, and when the compression ratio is changed the reading of the same original, the compression operation using the changed compression ratio, the storing of the compressed image data, the determination operation, and the changing of the compression ratio are repeated, with the repetition being limited to a predetermined number of times, and the predetermined number of times being changed upon designation by a user.

2. The method according to claim 1 further comprising:
   measuring a data amount of the compressed image data; and
   re-ensuring, performed in advance of changing the compression ratio first time, a memory area capable of storing image data in the measured data amount or a maximum memory area available when the memory area cannot be ensured when the compressed image data is not completely stored in the ensured memory area.

3. The method according to claim 1, wherein, in ensuring the memory area, the memory is ensured on the basis of the compression ratio and an original size.

4. The method according to claim 1, wherein, in changing the compression ratio, the compression ratio is increased by one step.

5. The method according to claim 1, wherein, in compressing the image data, JPEG compression is performed.

6. A control method for an image input apparatus for reading an original and compressing image data of the read original in real time, said method comprising:
   ensuring a memory area for storing compressed image data;
   reading an original and outputting image data;
   compressing the image data in real time;
   storing the compressed image data in the ensured memory area;
   determining whether the compressed image data is completely stored in the ensured memory area; and
   changing a resolution
   wherein the changing of the resolution is performed when the compressed image data is not completely stored in the ensured memory area, and when the resolution is changed, the reading of the same original using the changed resolution, the compression operation, the storing of the compressed image data, the determination operation, and the changing of the resolution are repeated, with the repetition being limited to a predetermined number of times, and the predetermined number of times being changed upon designation by a user.

7. The method according to claim 6 further comprising:
   measuring a data amount of the compressed image data; and
   re-ensuring, performed in advance of changing the resolution first time, a memory area capable of storing image data in the measured data amount or a maximum memory area available when the memory area cannot be ensured when the compressed image data is not completely stored ensured memory area.

8. The method according to claim 6, wherein, in ensuring the memory area, the memory area is ensured on the basis of an original size.

9. The method according to claim 6, wherein, in changing the resolution, the resolution is decreased by one step.

10. The method according to claim 9, further comprising setting a width of one-step decrease of the resolution.

11. The method according to claim 6, wherein, in changing the resolution, the resolution is changed for a color difference component of the image data.

12. The method according to claim 6, wherein, in compressing the image data, JPEG compression is performed.

13. An image input apparatus comprising:
   a read unit adapted to read an original and output image data;
   a compression means unit adapted to compress the image data in real time;
   storage unit adapted to store the compressed image data;
   a control unit adapted to ensure in said storage unit a memory area for storing the compressed image data, control to store the compressed image data into the ensured memory area, and, as long as the compressed image data is not completely stored in the ensured memory area, repeatedly perform an operation of changing a compression ratio of said compression unit, controlling said read unit to read the same original, controlling said compression unit to compress the image data using the changed compression ratio, and storing the compressed image data in the ensured memory area, with the repetition of the operation being limited to a predetermined number of times; and
   a setting unit adapted to set the number of times.

14. The apparatus according to claim 13 wherein said control unit measures a data amount of the compressed image data, and when the image data is not completely stored, re-ensures, in advance of changing the compression ratio first time, in said storage unit a memory area capable of storing image data in the measured data amount or a maximum memory area available when the memory area cannot be ensured.

15. The apparatus according to claim 13, wherein said memory area of the storage unit is ensured on the basis of the compression ratio and an original size.

16. The apparatus according to claim 13, wherein said control unit increases the compression ratio by one step.

17. The apparatus according to claim 13, wherein said compression unit performs JPEG compression.

18. An image input apparatus comprising:
a read unit adapted to read an original and output image data;
a compression unit adapted to compress the image data in real time;
a storage unit adapted to store the compressed image data;
a control unit adapted to ensure in said storage unit a memory area for storing the compressed image data, control to store the compressed image data into the ensured memory area, and, as long as the compressed image data is not completely stored in the ensured memory area, repeatedly perform an operation of changing a resolution used by said read unit, controlling said read unit to read the same original using the changed resolution, controlling said compression unit to compress the image data, and storing the compressed image data in the ensured memory area, with the repetition of the operation being limited to a predetermined number of times; and
a setting unit adapted to set the number of times.

19. The apparatus according to claim 18 wherein said control unit measures a data amount of the compressed image data, and when the image data is not completely stored, re-ensures, in advance of changing the resolution first time, in said storage unit a memory area capable of storing image data in the measured data amount or a maximum memory area available when the memory area cannot be ensured.

20. The apparatus according to claim 18, wherein said memory area of the storage unit is ensured on the basis of an original size.

21. The apparatus according to claim 18, wherein said control unit decreases the resolution by one step.

22. The apparatus according to claim 21 further comprising a setting unit adapted to set a width of one-step decrease of the resolution.

23. The apparatus according to claim 18, wherein said control unit changes the resolution for a color difference component of the image data.

24. The apparatus according to claim 18, wherein said compression unit performs JPEG compression.

25. A computer program product comprising a computer usable medium having computer readable program code means embodied in said medium for realizing the control method described in claim 1.

26. A computer program product comprising a computer usable medium having computer readable program code means embodied in said medium for realizing the control method for described in claim 7.

27. The method according to claim 2, wherein the compression ratio is changed when the memory area capable of storing image data in the measured data amount cannot be re-ensured, and the repetition is executed.

28. The apparatus according to claim 14, wherein said control unit executes the repetition of the operation when the memory area capable of storing image data in the measured data amount can not be re-ensured in said storage unit.

29. The method according to claim 7, wherein the resolution is changed when the memory area capable of storing image data in the measured data amount cannot be re-ensured, and the repetition is executed.

30. The apparatus according to claim 19, wherein said control unit executes the repetition of the operation when the memory area capable of storing image data in the measured data amount can not be re-ensured in said storage unit.

* * * * *